(12) United States Patent
Herman et al.

(10) Patent No.: US 12,060,235 B2
(45) Date of Patent: *Aug. 13, 2024

(54) BOTTOM DUMP PNEUMATIC MATERIAL HANDLING SYSTEM

(71) Applicant: Quickthree Technology LLC, Yardley, PA (US)

(72) Inventors: Alvin Herman, Saskatoon (CA); Erin Herman, Clavet (CA); William John Young, Newtown, PA (US)

(73) Assignee: Quickthree Technology, LLC, Yardley, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,600

(22) Filed: Jan. 18, 2022

(65) Prior Publication Data

US 2022/0135352 A1 May 5, 2022

Related U.S. Application Data

(63) Continuation of application No. 16/740,578, filed on Jan. 13, 2020, now Pat. No. 11,267,663.

(Continued)

(51) Int. Cl.
*B65G 41/00* (2006.01)
*B65D 83/06* (2006.01)
(Continued)

(52) U.S. Cl.
CPC ............. *B65G 65/42* (2013.01); *B65D 83/06* (2013.01); *B65D 88/548* (2013.01); *B65G 2814/032* (2013.01)

(58) Field of Classification Search
CPC .. B65G 41/00; B65G 65/42; B65G 2814/032; B65D 83/06; B65D 88/548; B65D 88/54
(Continued)

(56) References Cited

U.S. PATENT DOCUMENTS

| | | | |
|---|---|---|---|
| 1,431,857 | A | 10/1922 | Willcox |
| 2,255,925 | A | 9/1941 | Heylandt et al. |

(Continued)

FOREIGN PATENT DOCUMENTS

| | | |
|---|---|---|
| CA | 2888014 | 10/2016 |
| EP | 1774843 | 4/2007 |
| GB | 2028759 | 3/1980 |

OTHER PUBLICATIONS

US 2013/0180831 A1, Ryder et al., Jul. 18, 2013.*
(Continued)

*Primary Examiner* — Douglas A Hess
(74) *Attorney, Agent, or Firm* — Sheehan Phinney Bass & Green PA

(57) ABSTRACT

A material (e.g., proppant) handling system includes a storage container, a mechanical conveyor system, and a pneumatic conveyor system. The mechanical conveyor system is configured to convey material from an unloading station to a conveyor system discharge and into an inlet of the storage container (e.g., at an elevation that is higher than the unloading station). The pneumatic delivery system is configured to deliver material from the storage container to an off-system destination (e.g., a silo or the like), pneumatically. In a typical implementation, the storage container, the mechanical conveyor system, and the pneumatic conveyor system are all on, or connected to, or supported by one common chassis.

36 Claims, 17 Drawing Sheets

Related U.S. Application Data

(60) Provisional application No. 62/792,589, filed on Jan. 15, 2019.

(51) Int. Cl.
  *B65D 88/54* (2006.01)
  *B65G 65/42* (2006.01)

(58) Field of Classification Search
  USPC .................. 198/300, 311, 314, 523; 414/502
  See application file for complete search history.

(56) References Cited

U.S. PATENT DOCUMENTS

| | | |
|---|---|---|
| 3,986,708 A | 10/1976 | Heltzel et al. |
| 4,427,133 A | 1/1984 | Kierbow |
| 4,701,095 A | 10/1987 | Berryman |
| 4,850,750 A | 7/1989 | Cogbill et al. |
| 4,961,539 A | 10/1990 | Deem |
| 5,096,336 A | 3/1992 | Merrett |
| 5,125,223 A | 6/1992 | McKenna |
| 5,538,286 A | 7/1996 | Hoff |
| 5,779,398 A | 7/1998 | Battle |
| 5,819,950 A | 10/1998 | McCloskey |
| 6,089,795 A | 7/2000 | Booth |
| 6,155,175 A | 12/2000 | Rude et al. |
| 6,378,686 B1 | 4/2002 | Mayer et al. |
| 6,415,909 B1 | 7/2002 | Mitchell et al. |
| 7,264,104 B2 | 9/2007 | Heeszel et al. |
| D688,597 S | 8/2013 | Oren |
| D694,670 S | 12/2013 | Oren |
| 8,662,285 B2 | 3/2014 | Jesse |
| 8,668,430 B2 | 3/2014 | Oren |
| 8,714,344 B2 | 5/2014 | Kowalchuk et al. |
| 8,734,081 B2 | 5/2014 | Stegemoeller |
| 8,915,691 B2 | 12/2014 | Mintz |
| 8,974,170 B2 | 3/2015 | Ryder |
| 9,022,835 B1 | 5/2015 | Gus |
| 9,162,603 B2 | 10/2015 | Oren |
| 9,248,772 B2 | 2/2016 | Oren |
| 9,260,257 B2 | 2/2016 | Stegemoeller |
| 9,340,353 B2 | 5/2016 | Oren |
| 9,394,102 B2 | 7/2016 | Oren |
| 9,421,899 B2 | 8/2016 | Oren |
| 9,440,785 B2 | 9/2016 | Oren |
| 9,446,801 B1 | 9/2016 | Oren |
| 9,499,348 B2 | 11/2016 | Teichrob |
| 9,527,664 B2 | 12/2016 | Oren |
| 9,549,505 B1 | 1/2017 | Pikesh et al. |
| 9,573,507 B2 | 2/2017 | Wolowski et al. |
| RE46,334 E | 3/2017 | Oren |
| 9,630,223 B1 | 4/2017 | Smith |
| 9,643,774 B2 | 5/2017 | Oren |
| 9,656,799 B2 | 5/2017 | Oren |
| 9,663,303 B2 | 5/2017 | Waldner et al. |
| 9,670,752 B2 | 6/2017 | Glynn |
| 9,676,554 B2 | 6/2017 | Glynn |
| 9,694,970 B2 | 7/2017 | Oren |
| 9,701,463 B2 | 7/2017 | Oren |
| 9,702,093 B2 | 7/2017 | Manhart |
| 9,718,609 B2 | 8/2017 | Oren |
| 9,725,234 B2 | 8/2017 | Oren |
| 9,737,919 B2 | 8/2017 | Hartley |
| 9,738,439 B2 | 8/2017 | Oren |
| 9,758,081 B2 | 9/2017 | Oren |
| 9,771,224 B2 | 9/2017 | Oren |
| 9,790,022 B2 | 10/2017 | Sheesly |
| 9,796,319 B1 | 10/2017 | Oren |
| 9,815,620 B2 | 11/2017 | Oren |
| 9,834,373 B2 | 12/2017 | Oren |
| 9,862,551 B2 | 1/2018 | Oren |
| 9,902,576 B1 | 2/2018 | Oren |
| 9,919,882 B2 | 3/2018 | Oren |
| 9,963,308 B2 | 5/2018 | Oren |
| 9,969,564 B2 | 5/2018 | Oren |
| 9,988,215 B2 | 6/2018 | Glynn |
| 10,001,002 B2 | 6/2018 | Fisher et al. |
| 10,023,381 B2 | 7/2018 | Baitaille |
| 10,035,668 B2 | 7/2018 | Oren |
| 10,059,246 B1 | 8/2018 | Oren |
| 10,065,816 B2 | 9/2018 | Oren |
| 10,077,610 B2 | 9/2018 | Pham |
| 10,104,833 B2 | 10/2018 | Beaujot et al. |
| 10,106,332 B2 | 10/2018 | Naizer |
| 10,179,703 B2 | 1/2019 | Glynn |
| 10,301,108 B2 | 5/2019 | Herman et al. |
| 10,406,961 B2 | 9/2019 | Grodecki et al. |
| 10,518,982 B1 | 12/2019 | Fike et al. |
| 10,550,694 B2 | 2/2020 | Watson et al. |
| 11,531,076 B2 * | 12/2022 | Ajoy .................... G01R 33/282 |
| 2003/0142579 A1 | 7/2003 | Throop |
| 2007/0089966 A1 | 4/2007 | Gausman |
| 2011/0103901 A1 | 5/2011 | Hetcher |
| 2012/0292257 A1 | 11/2012 | Hartley |
| 2012/0312662 A1 | 12/2012 | Kowalchuk |
| 2013/0180831 A1 | 7/2013 | Ryder |
| 2013/0206415 A1 | 8/2013 | Sheesley |
| 2014/0044508 A1 | 2/2014 | Luharuka |
| 2015/0044004 A1 | 2/2015 | Pham |
| 2015/0251108 A1 | 9/2015 | Hartley |
| 2016/0001989 A1 | 1/2016 | Oren |
| 2016/0031658 A1 | 2/2016 | Oren |
| 2016/0130095 A1 | 5/2016 | Oren |
| 2016/0244278 A1 | 8/2016 | Oren |
| 2016/0264352 A1 | 9/2016 | Oren |
| 2016/0280480 A1 | 9/2016 | Smith |
| 2017/0240350 A1 | 8/2017 | Oren |
| 2017/0267151 A1 | 9/2017 | Oren |
| 2017/0283165 A1 | 10/2017 | Oren |
| 2017/0291760 A1 | 10/2017 | Oren |
| 2018/0050864 A1 | 2/2018 | Oren |
| 2018/0065814 A1 | 3/2018 | Eiden, III |
| 2018/0171761 A1 | 6/2018 | Schneider et al. |
| 2018/0178999 A1 | 6/2018 | Sherwood |
| 2018/0208395 A1 | 7/2018 | Sheesley |
| 2018/0251324 A1 | 9/2018 | Sucre |
| 2018/0257857 A1 | 9/2018 | Fisher |
| 2018/0319585 A1 | 11/2018 | Bataille |
| 2018/0369762 A1 | 12/2018 | Hunter |

OTHER PUBLICATIONS

International Search Report and Written Opinion for PCT/US20/13421, dated Apr. 20, 2020.

Meyer Industrial Solutions; Pneumatic Screw Pump; meyerindustrial.com/products/pneuamtic-screw-pump; Nov. 2019; retrieved Jun. 24, 2021.

Mills, David; "Pneumatic Conveying Design Guide", second edition, 2004.

Henan Quanshun Flow Control Science & Technology Co. Ltd; Pneumatic Ceramic Rotary Gate Valve; qsalve.en.made-in-china.com/product/zBtnelykrsWX/China-Pneumatic-Ceramic-Rotary-Gate-Valve.html; Nov. 2019, retrieved Jun. 24, 2021.

FB Industries; Atlas Conveyor, "The Unsurpassed Solution for Frac Sand Storage and Handling" Dec. 4, 2017; retrieved Jun. 24, 2021.

Schenck Process Group; Pneumatic Conveying Systems for Dense Phase and Dilute-Demonstrated https://www.youtube.com/watch?v=niYQwllC9O0 Nov. 2019.

* cited by examiner

BOTTOM DUMP PNEUMATIC MATERIAL HANDLING SYSTEM

CROSS-REFERENCE TO RELATED APPLICATION(S)

This application is a continuation of U.S. patent application Ser. No. 16/740,578, filed Jan. 13, 2020, and entitled Bottom Dump Pneumatic Material Handling System, which claims the benefit of U.S. Provisional Patent Application Ser. No. 62/792,589, filed Jan. 15, 2019, and entitled Bottom Dump Pneumatic Material Handling System. The disclosure of the prior applications are incorporated by reference herein in their entirety.

FIELD OF THE INVENTION

This application relates to a handling system for bulk powder or granular material, such as proppant, and methods of utilizing the proppant handling system and, more specifically, relates to a proppant handling system configured to receive a bottom dump (or gravity fed) proppant delivery and to convey that proppant delivery, pneumatically, to an off-system destination (e.g., a silo or the like).

BACKGROUND

Hydraulic fracturing (or fracking) refers to a well stimulation technique that involves injecting high-pressure fracking fluid into a wellbore to create cracks in deep-rock formations through which petroleum resources, such as oil or natural gas, can flow. Fracking fluid may vary in composition depending on a variety of considerations and the specific application to which the fracking fluid is to be applied. Typically, however, fracking fluid contains sand or some other proppant that is designed to keep any fractures produced by the fracking process open during and after the fracking process.

Proppant (e.g., sand or the like) typically is delivered to a work site (e.g., a hydraulic fracturing well head), stored temporarily at the work site in one or more silos or other types of storage containers, then, at an appropriate time, blended together with other components of the fracking fluid to form the end product to be injected into the wellbore.

A variety of other industries exist that involve handling bulk powder or granular material.

SUMMARY OF THE INVENTION

In one aspect, a handling system for bulk powder or granular material (e.g., proppant) includes a storage container, a mechanical conveyor system, and a pneumatic conveyor system. The mechanical conveyor system is configured to convey proppant from a proppant unloading station to a conveyor system discharge that unloads into a storage container that may have an inlet that is at a higher-elevation than the proppant unloading station. The pneumatic delivery system is configured to deliver proppant from the storage container to an off-system destination (e.g., a silo or the like), pneumatically. In a typical implementation, the storage container, the mechanical conveyor system, and the pneumatic conveyor system are all on, or connected to or supported by, a common portable chassis (e.g., a trailer chassis, skid, framework, base, etc.).

In another aspect, a method is disclosed for using the handling system at a worksite (e.g., near a wellhead for a hydraulic fracking operation, where there are silos or other types of onsite proppant storage containers). The method includes providing the handling system at the worksite, receiving a delivery of material (e.g., proppant) at the handling system, conveying the material in the system to the system's storage container, and utilizing the system's pneumatic conveying system to convey the material from the storage container to an off-system destination (e.g., an onsite silo or the like).

In some implementations, one or more of the following advantages are present.

For example, in some implementations, the handling system described herein provides a simple, elegant solution for conveying material (e.g., proppant) that has been delivered to a worksite via a gravity feed trailer or other container, into a silo or other onsite container, pneumatically. In this regard, many dry bulk products can be transported economically in bottom dump or end dump containers (or even in pneumatic trailers that have bottom dump capabilities) where they are unloaded via gravity flow out the lowest point of the container. At the destination it may be desirable to move the product pneumatically, into a silo or the like, to suit existing work methods and physical facilities. In various implementations, the systems and techniques disclosed herein can help facilitate achieving that goal.

Moreover, in a typical implementation, the handling system described herein can provide fairly significant advantages if it is available at a worksite (e.g., near a hydraulic fracturing wellhead site with silos and/or other onsite proppant storage containers). More specifically, having the handling system available at such a worksite would make that worksite very well suited to receive a delivery of material (e.g., proppant) from virtually any kind of conventional proppant delivery vehicle or container. If, for example, a proppant delivery arrived via a pneumatic trailer, then the proppant could simply be conveyed directly from the pneumatic trailer into any one or more of the silos or other storage containers (bypassing system 100) by using the trailer's own pneumatic delivery system. Alternatively, if the pneumatic trailer also has bottom dump capabilities, them the pneumatic trailer could be used to deliver proppant via bottom dump into the handling system. In many instances, unloading via bottom dump in reliance on gravity may be faster, and energy efficient, than unloading in reliance on the trailer's built-in pneumatic conveying system.

If, however, a proppant delivery arrived via a gravity feed trailer (positioned over the proppant unloading station 102), then the proppant could be gravity fed into the proppant handling system and the proppant handling system can be used to convey the proppant into the silo or other off-system storage container with pneumatic power.

Likewise, if the proppant delivery arrived in a proppant delivery container, such as a container made by the SandBox Logistics™ company, then the proppant delivery container can be placed atop the proppant handling system (e.g., supported by a cradle or container unloader kit, described herein), emptied into the proppant handling system (via gravity), and the proppant handling system can be used to convey the proppant into the silo or other off-system storage container with pneumatic conveyance.

In some implementation, the delivery system described herein has some built-in redundancies that can provide a hedge against the possibility of certain system components failing, but that also can be used to throttle the system's proppant delivery rate up or down.

Moreover, in various implementations, the storage container between the truck unloading conveyor and pneumatic system provides more than just a convenient transition between one conveyor (i.e., a mechanical one) and a second conveyor (i.e., a pneumatic one). For instance, in some implementations, the storage container can provide a buffer between disparate conveying rates between the mechanical conveyor system (which may include one or more belt conveyors) and the pneumatic system. Pneumatic systems tend to be slower than mechanical conveying systems and so establishing a good transfer rate and operating it at steady-state may be desirable rather than taking the slower system and then adding inefficiency by sporadic flow of product. Moreover, the storage container may allow movement of trucks between separate storage hoppers or different trucks without running the pneumatic system out of product. By its nature, unloading the trucks creates uneven flow—start/stop, move truck to next hopper, switch trucks etc. so there may be lots of non-productive time in terms of unloading. The storage container allows for a fast belt conveyor that creates a buffer of product to allow the pneumatics to operate continuously (or more continuously than the mechanical conveyor), often at a steady, optimal rate. Moreover, the storage container may allow more trucks to be unloaded, via gravity, more quickly than pneumatics would do alone.

Other features and advantages will be apparent from the description and drawings, and from the claims.

BRIEF DESCRIPTION OF THE DRAWINGS

Like reference characters refer to like elements.

DETAILED DESCRIPTION

Figure 1:
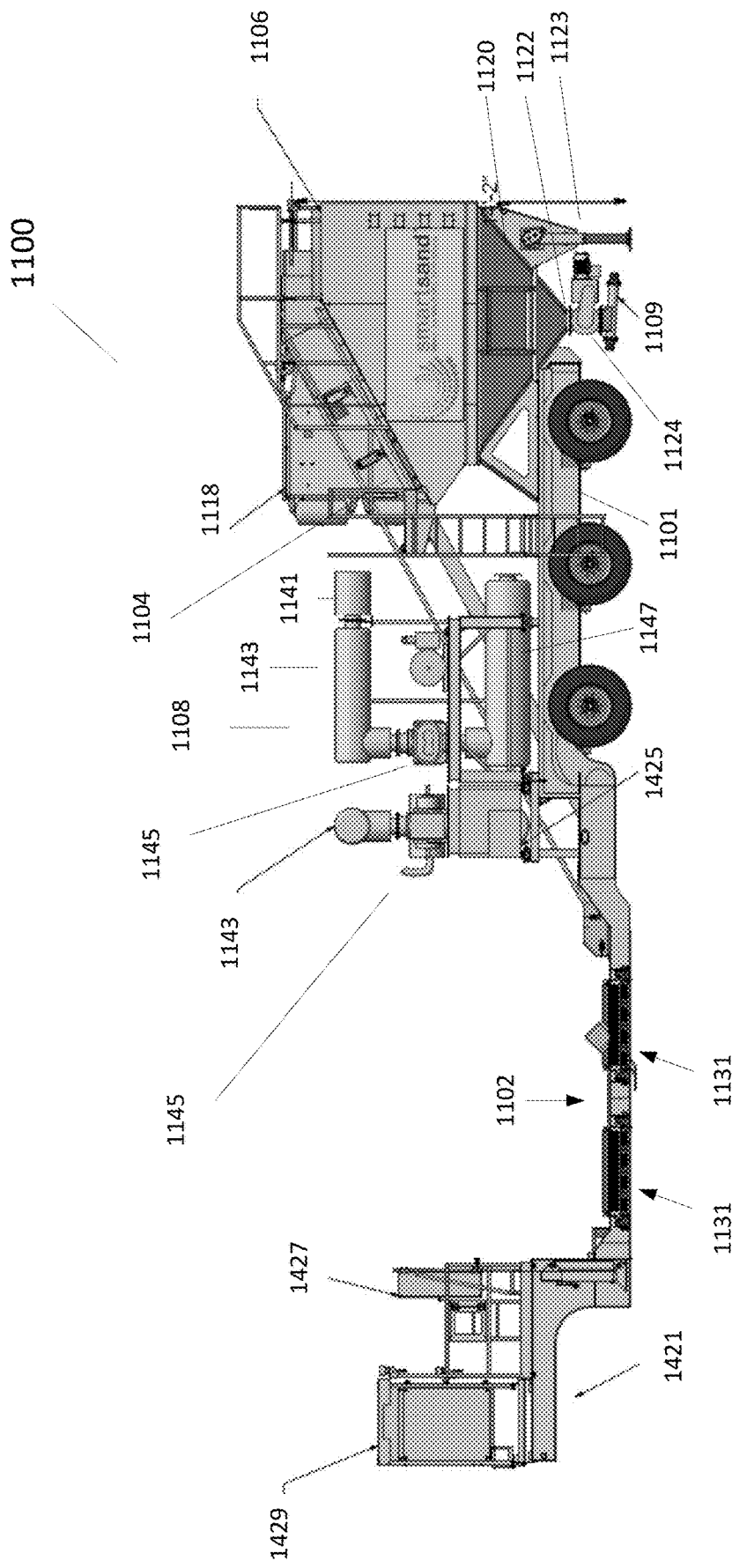
FIG. 1 is a side view of an exemplary material (e.g., proppant) handling system with ramps in a lowered position.
Figure 2:
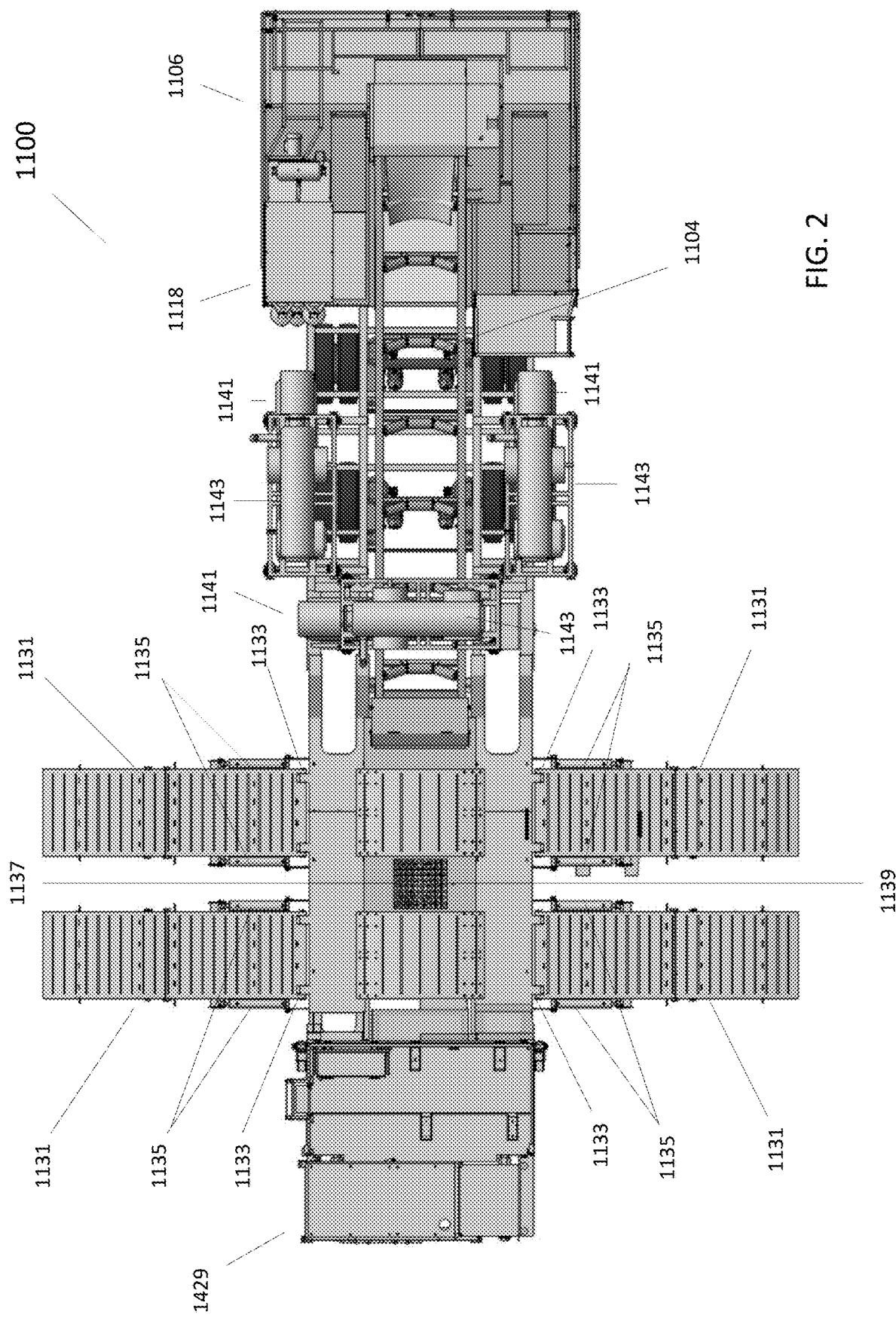
FIG. 2 is a top view of the material handling system of FIG. 1 with ramps in a lowered position.
Figure 3:
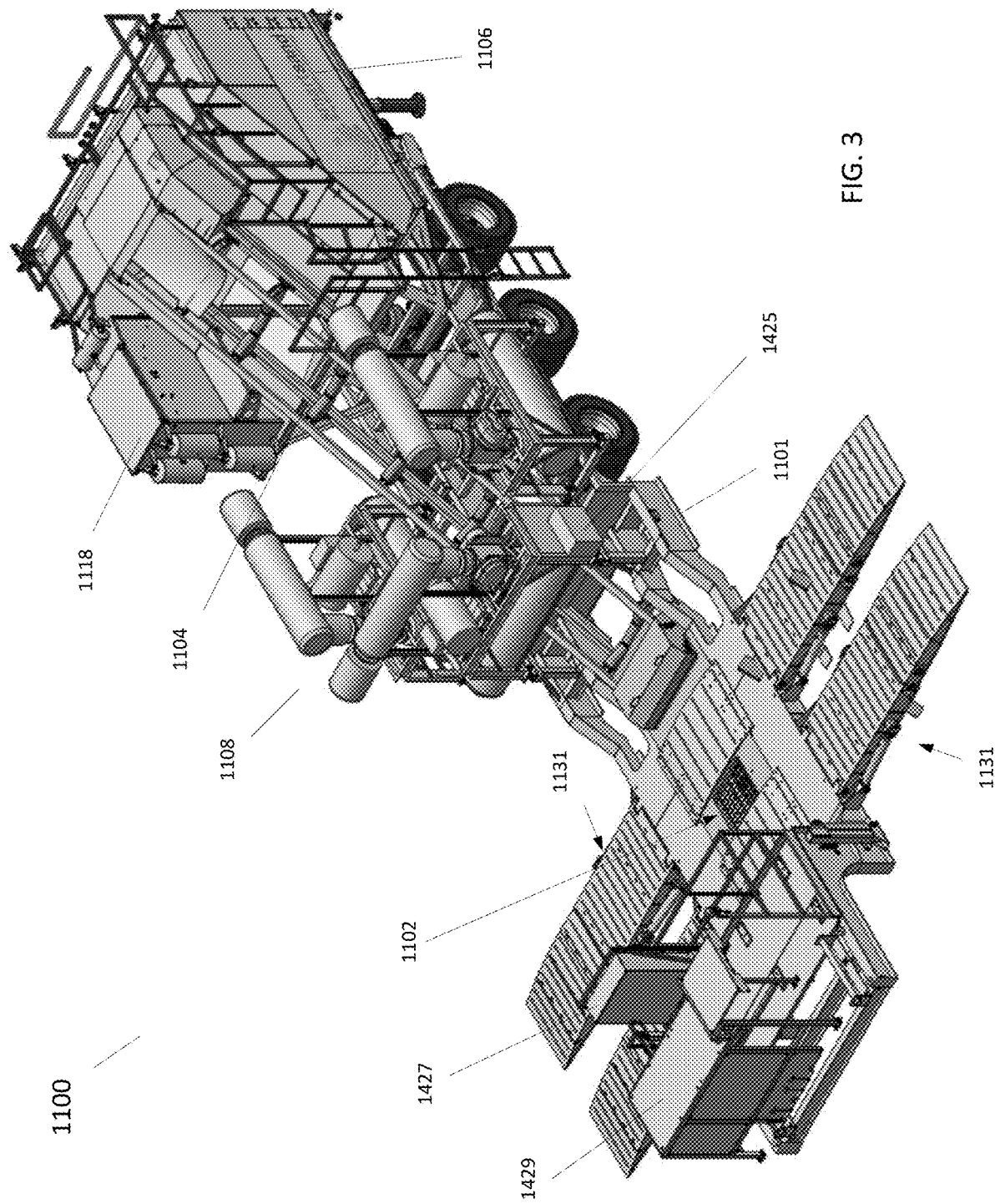
FIG. 3 is a perspective view of the material handling system of FIG. 1 with ramps in a lowered position.
Figure 4:
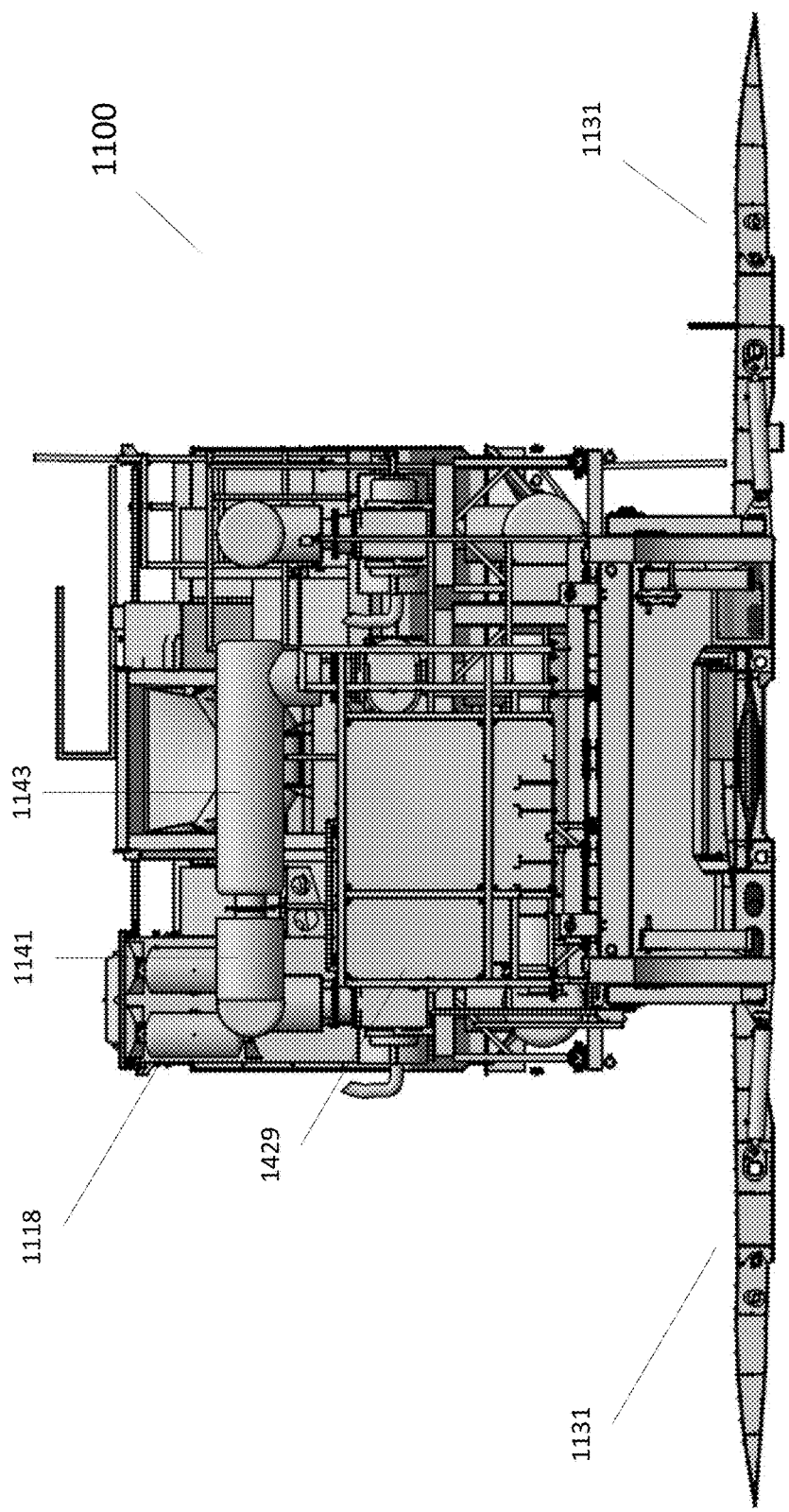
FIG. 4 is a front view of the material handling system of FIG. 1 with ramps in a lowered position.
Figure 5:
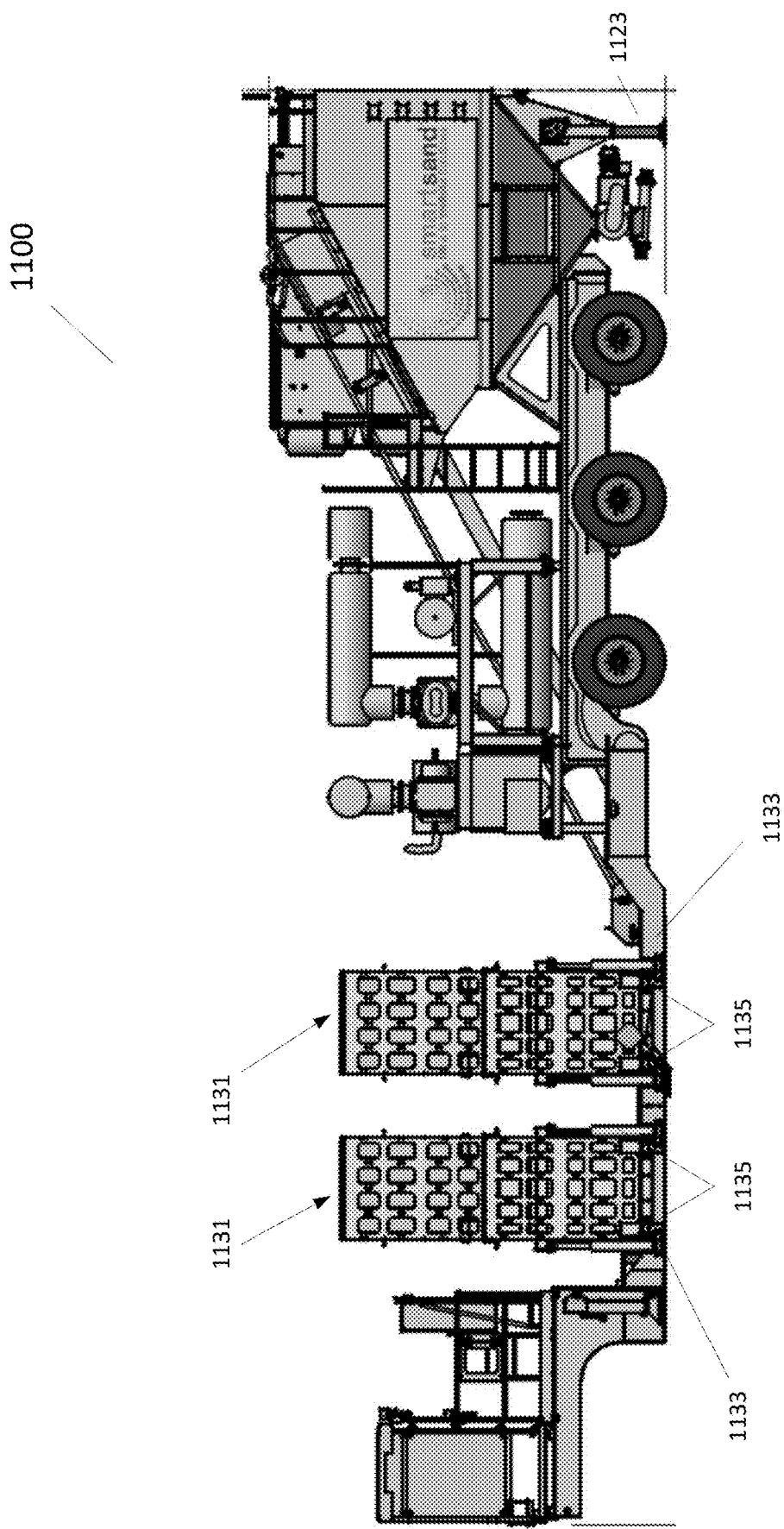
FIG. 5 is a side view of the material handling system of FIG. 1 with ramps in a raised position.
Figure 6:
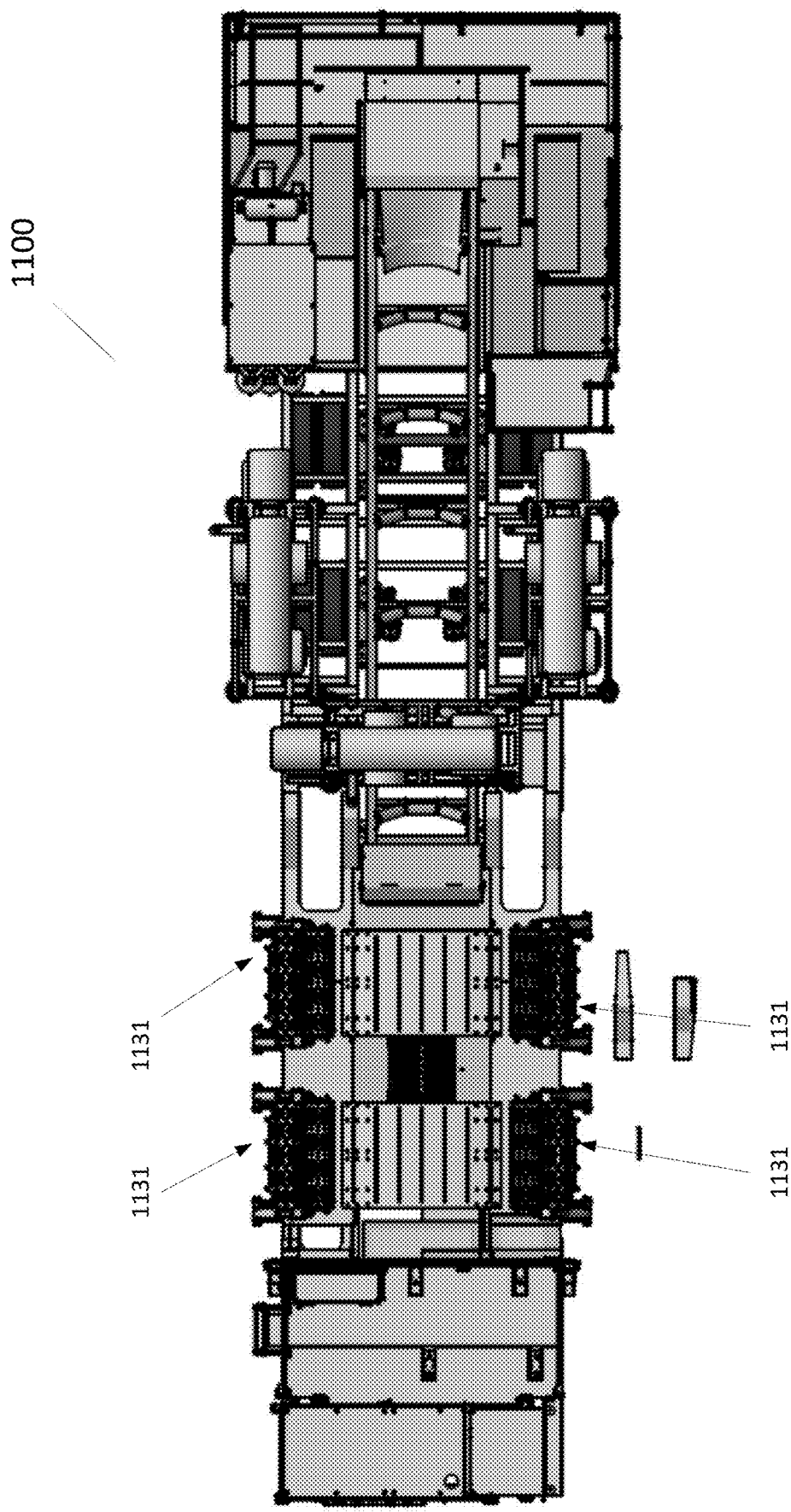
FIG. 6 is a top view of the material handling system of FIG. 1 with ramps in a raised position.
Figure 7:
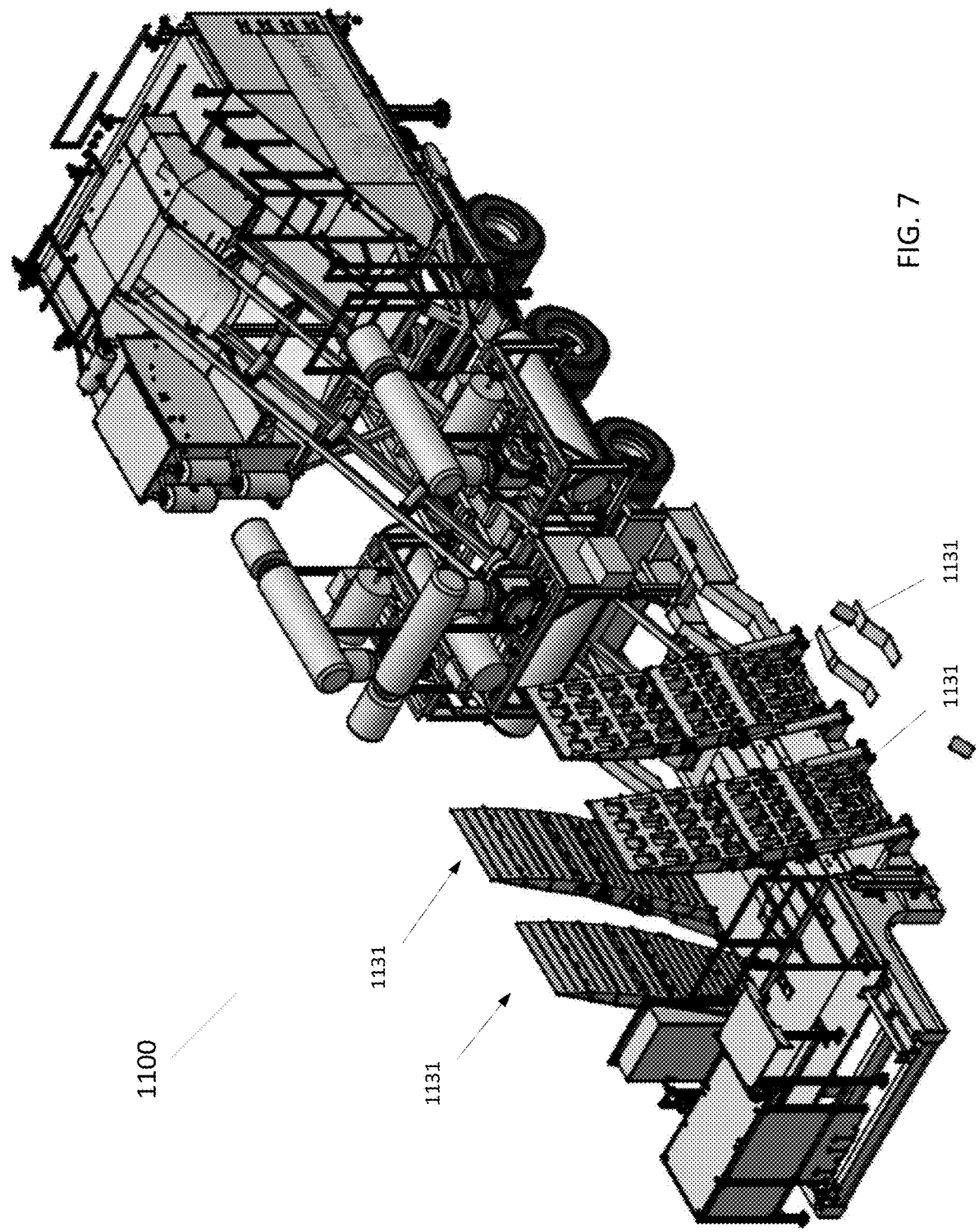
FIG. 7 is a perspective view of the material handling system of FIG. 1 with ramps in a raised position.
Figure 8:
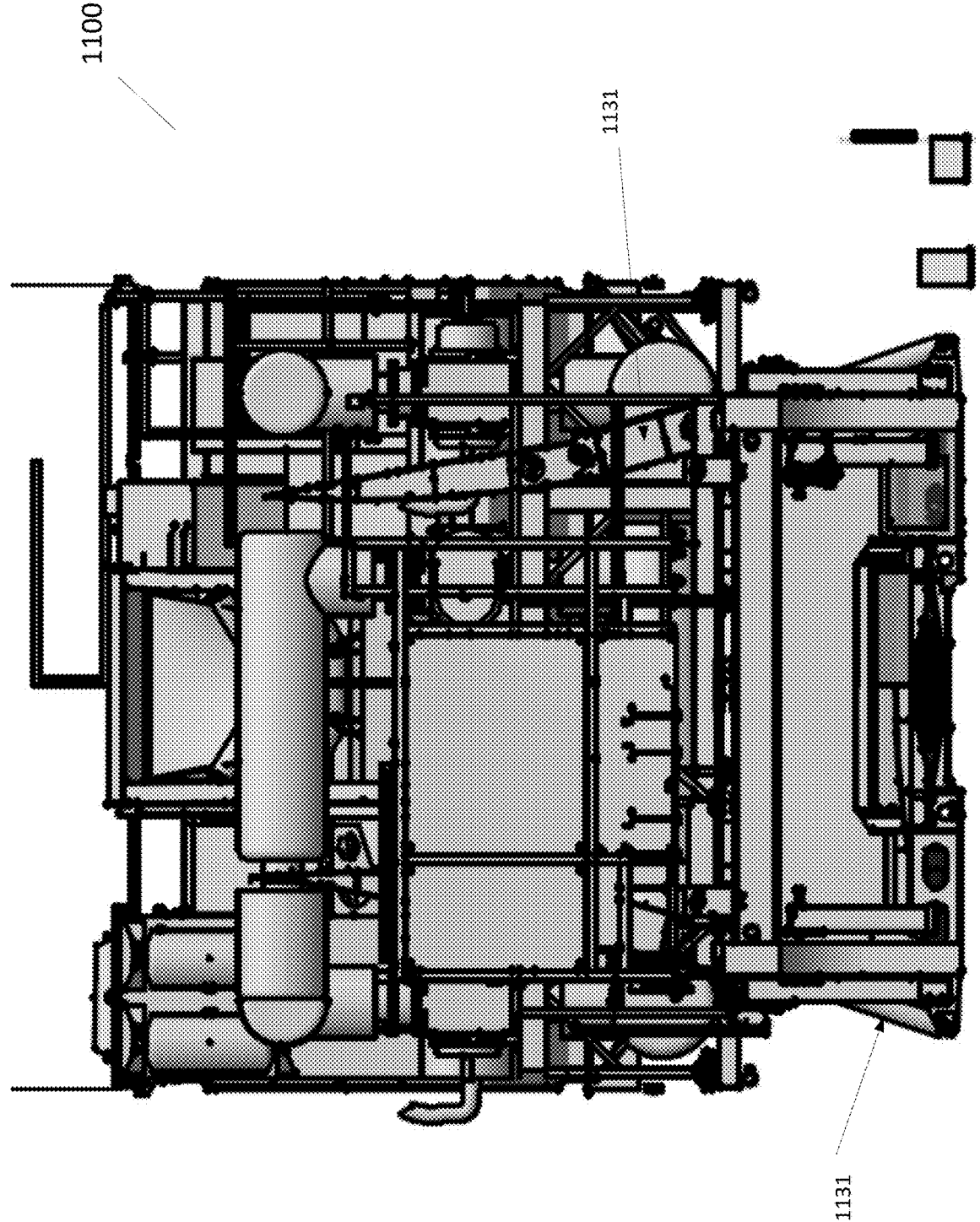
FIG. 8 is a front view of the material handling system of FIG. 1 with ramps in a raised position.

There are a variety of ways that material (e.g., proppant) can be delivered to a worksite (e.g., a wellhead in the hydraulic fracturing (fracking) industry).

One way of delivering proppant to a worksite uses pneumatic trailers that have built-in provisions for pneumatically unloading the proppant directly into an onsite silo. If proppant is delivered to a worksite using a pneumatic trailer, then the proppant usually can be off-loaded easily using the trailer's own pneumatic conveying system. The pneumatic system on the trailer, however, can be complex, costly, heavy and take up a lot of valuable space on the trailer that otherwise might be used to carry more proppant. Moreover, pneumatic conveyance can, in some instances, be slower than bottom dump gravity conveyance.

Another way of delivering proppant to a worksite uses gravity feed trailers that simply drop the proppant out of one or more openings in the bottom of the trailer under the influence of gravity. This is a relatively simple approach for delivering proppant to a worksite, and one that tends to maximize the proppant-carrying capacity of the trailer. These trailers also tend to be less expensive than pneumatic trailers and also unload faster and more efficiently than pneumatic trailers. However, if the proppant is simply dropped out of the bottom of the trailer, the worksite may need various material handling equipment to move the proppant up and into its onsite storage silos. This added equipment can be complex, costly, difficult to obtain where needed, particularly in a timely manner, and can require onsite expertise to assemble/operate.

Some pneumatic trailers also have the ability to deliver material via gravity through a hoppered opening via bottom dump in addition to pneumatic conveying capabilities.

Yet another way of delivering proppant to a worksite uses discrete proppant delivery containers, such as the type of containers available from the SandBox Logistics™ company that are able to be lifted off a delivery trailer with a forklift, for example, and placed, full of proppant, onsite for temporary storage. These types of containers can be loaded by forklift onto a cradle or container unloader kit that enables the proppant to be gravity fed from the container into a blender hopper, for example. Using these kinds of proppant delivery containers provides for a relatively simple way of delivering proppant to a worksite. However, storing the proppant delivery containers onsite requires extra storage space onsite. Moreover, various material handling equipment may be needed at the worksite to facilitate delivering proppant from the container into the blender hopper and/or into a silo. This added equipment can be complex, costly, difficult to obtain where needed, particularly in a timely manner, and can require onsite expertise to assemble/operate.

FIGS. 1-8 show an example of a material handling system 1100 that can be used at a worksite to conveniently transfer proppant, for example, from a gravity feed source (e.g., a trailer, proppant delivery container, etc., not shown in FIGS. 1-8) into a silo or other storage container onsite (also not shown in FIGS. 1-8), pneumatically.

If the illustrated system 1100 is available at a particular worksite that has one or more silos, then proppant can be easily conveyed into any of those silos, pneumatically, regardless of how the proppant was delivered to the worksite (i.e., whether the delivery was by pneumatic trailer, by gravity feed trailer, by one of the proppant delivery containers mentioned above, or by some other means). Moreover, the material handling system 1100 is portable and, therefore, can be moved around a worksite, or from worksite-to-worksite, with relative ease to deliver the proppant into silos. Of course, this portability makes the material handling system 1100 easy to stow away when not being used as well. The system 1100 also is relatively simple in design and operation.

At the outset, it should be made clear that FIGS. 1-8 show only one example of how certain aspects of the invention(s) disclosed herein may be implemented. Numerous variations are possible. Indeed, each individual component of the system 1100 shown in FIGS. 1-8 could be replaced with a different component(s) that performs substantially similarly as the component shown without departing from the spirit and scope of the invention(s). The arrangement of components also can be varied without departing the spirit and scope of the invention(s). This idea is reiterated and expanded upon throughout the specification.

The illustrated system 1100 has a chassis 1101 supported on wheels 1105. The front end of the chassis 1101 can be connected to a truck or other vehicle for hauling around as desired or needed. All other system components shown in the illustrated implementation are mounted, either directly or indirectly, onto and, therefore, supported by the chassis 1101.

The illustrated system 1100 has a proppant unloading station 1102, a mechanical conveying system 1104, a proppant holding container 1106, and a pneumatic conveying system 1108. The proppant unloading station 1102 is configured so that a bottom dump trailed can be driven over the proppant unloading station 1102 and delivery proppant (e.g., via gravity drop) into the proppant unloading station 1102. The mechanical conveying system 1104 utilizes mechanical components (e.g., a conveyor belt assembly) to convey the proppant from the proppant unloading station 1102 up and into an opening at or near the top of the proppant holding container 1106. Belts are absent in FIG. 2, for example, but would follow the angled upward track defined by the belt supports shown. The pneumatic conveying system 1108 uses pneumatic pressure to convey proppant that is released from the bottom of the proppant holding container 1106 to a discharge 1109 near a rear of the system 1100. In a typical implementation, a hose or pipe can be attached to the discharge 1109 of the pneumatic conveying system 1108 to carry the discharged proppant to an on-site storage container, such as a silo or the like. An air lock 1124 (or functionally similar structure(s)) is provided to allow the proppant to move from the proppant holding container 1106 into the pneumatic conveying system 1108, without compromising the pressure differential between the proppant holding container 1106 and the pneumatic conveying system 1108.

The chassis 1101 in the illustrated system 1100 is a rigid structure and includes high strength, typically metallic, beams that may be welded together to form a structure or frame to support various other system components, as shown. The chassis 1101 is coupled to, and supported by, the wheels 1105 and typically includes provisions for hitching the chassis 1101 to a hauling vehicle. In a typical implementation, t one or more rigid plates are provided to form platforms or walls that may be mounted to and supported by the frame structure of the chassis 1100 as well.

The chassis 1100 supports a drive-over ramp assembly 1130. The drive-over ramp assembly 1130 includes four ramp panels 1131—two on each lateral side of the chassis 1100. Each ramp panel 1131 is supported at a proximal end by a hinged connection 1133 along an upper lateral side edge of the chassis 1101 that enables the ramp panel 1131 to move, about the hinged connection 1133, between the deployed position (shown in FIG. 1-4) and a stowed (or transport) position (shown in FIGS. 5-8). In the stowed (or transport) position (shown in FIGS. 5-8), the ramp panels 1131 extend in a substantially upward (and slightly inward) direction. In the deployed position (shown in FIGS. 1-4), the ramp panels 1131 extend laterally outward and downward so that their distal ends rest on the ground, thereby forming a ramp, over which a proppant delivery vehicle can drive.

In the illustrated implementation, hydraulic rams 1135 provide the energy to move the ramp panels 1131 between the deployed position and the stowed position. Each ramp panel 1131 has two hydraulic rams 1135—one at a forward end of the ramp panel 1131 and one at a rear end of the ramp panel 1131. Each hydraulic ram 1135 has a first end that is secured to and supported by a portion of the chassis that remains stationary as the associated ramp panel 1131 moves up or down, and a second end that is secured to the ramp panel 1131 itself. In the illustrated implementation, the hydraulic rams 1135 extend to raise the ramp panels 1131 and retract to lower the ramp panels 1131.

The ramp panels 1131 are configured to facilitate a proppant delivery vehicle driving over them to position its bottom dump opening above the proppant unloading station 1102. More specifically, there is a forward-most ramp panel and a rear-most ramp panel on each side of the chassis. In the deployed position (FIGS. 1-4), the forward-most ramp panel on the left side of the chassis aligns with the forward-most ramp panel on the right side of the chassis, and the rear-most ramp panel on the left side of the chassis aligns with the rear-most ramp panel on the right side of the chassis. Moreover, the forward-most ramp panel on each respective side of the chassis is sufficiently displaced from the rear-most ramp panel on that side of the chassis such that a proppant delivery vehicle (e.g., a delivery truck with bottom dump capabilities) attempting to drive over the ramp panels will have its right side wheels supported by either the forward-most ramp panels or the rear-most ramp panels, and will have its left side wheels supported by the other of the forward-most ramp panels or the rear-most ramp panels.

Panels extend across the top of the chassis 1101 to support the wheels of a proppant delivery vehicle driving over them. These panels, together with the ramp panels 1131, collectively define two tracks to support the wheels of a proppant delivery vehicle driving over the proppant unloading station 1102. The chassis and panels supported by the chassis near the proppant unloading station 1102 define an upward-facing aperture (or opening) 1137, covered by a grating 1139, between the two tracks. The aperture 1137 is above part of the mechanical conveying system 1104. More specifically, the aperture 1137 in the illustrated implementation is above a moving conveyor belt of the mechanical conveying system 1104. As such, if a proppant delivery vehicle drives over the ramp assembly and bottom dumps a delivery of proppant into the aperture 1137 and through the grading 1139, the moving conveyor belt can immediately convey the proppant, as it is being unloaded, in a rearward direction away from just under the grating 1137. In a typical implementation, the grating helps prevent large objects (e.g., non-proppant from falling into the mechanical conveying system 1104.

The mechanical conveying system 1104 moves the unloaded proppant away from the proppant unloading station 1102 and to an opening in or near the top of the proppant holding container 1106. There are a variety of ways that the mechanical conveying system 1104 can perform this function. In one exemplary implementation, the mechanical conveying system 1104 has one or more moving conveyor belts that convey the proppant in a rearward, horizontal direction away from the proppant unloading station 1102 and then in an upwardly angled direction to the opening in or near the top of the proppant holding container 1106. In one such implementation, the mechanical conveying system 1104 has a first section of conveyor belt that extends (and moves proppant) from just under the grating 1137 in a rearward direction to a second section of conveyor belt that extends (and moves proppant) from the end of the first section in an upwardly-angled direction to the opening in or near the top of the proppant holding container 1106.

In some implementations, the conveyor belt(s) may be curved to define a lateral cross-section with a somewhat concave upper surface to discourage proppant from falling off the sides of the conveyor belt as the proppant is being conveyed. In some implementations, other measures, such as providing separate physical barriers on the sides of the conveyor belt(s), may help prevent the proppant being conveyed from falling off the sides of the conveyor belt(s).

The conveyor belt(s) may be supported and/or directed, by pulleys and/or guide elements. The conveyor belt(s) can be powered in any one of a variety ways. In a typical implementation, one or more of the pulleys for the conveyor belt is driven by prime mover, such as an electric or hydraulic motor or the like.

The upward angle of the upwardly-angled portion of the conveyor belt will depend on the specific geometry of the system 1100. In some implementations, however, the upward angle is between about 10 to 45 degrees (or more preferably between about 20 to 30 degrees) from the longitudinal axis of the chassis 1101. In one exemplary implementation, the upward angle is 28 degrees.

The mechanical conveying system 1104 has a housing 1116 that covers significant portions of the mechanical conveying system 1104. This housing 1116 helps prevent contamination from getting into the system 1100 and potentially contaminating the proppant, and also helps contain any dust that may be generated by the proppant being conveyed in the mechanical conveying system 1104. The illustrated system 1100 also has a dust collector 1118 coupled to the housing 1116 of the mechanical conveyor system 1104 to help collect dust that is generated from the proppant being conveyed in the mechanical conveying system 1104.

The dust collector 1118 can perform its function in any one of a variety of ways. In some implementations, the dust collector 1118 may be a closed loop dust collection system like the dust collector in the Quickload 300™ transloading system, available from Smart Sand, Inc. In some implementations, the dust collector 1118 may be similar to any one of the dust collectors described in U.S. Pat. No. 10,301,108, entitled Silo Dust Collection and assigned to Quickthree Technology, LLC, the owner of this application. In some implementations, the dust collector creates a low pressure, or vacuum, inside the housing 1116 of the mechanical conveying system 1104. This low pressure, or vacuum, may help draw proppant into the system 1100 through the aperture at the proppant unloading station 1102, thereby helping to contain the escape of dust from the system at the point of unloading.

At the end of the mechanical conveying system 1104, proppant is dropped into an opening at or near the top of the proppant holding container 1106. In a typical implementation, the housing 1116 of the mechanical conveying system 1104 seals against the outer surface of the proppant holding container 1106 to prevent environmental contamination from entering the system 1100 and to prevent proppant dust from escaping to the environment.

The proppant holding container 1106 is a large, hollow, rigid container. In one implementation, the proppant holding container 1106 has a storage capacity of approximately 43 tons. In another implementation, the proppant holding container 1106 has a storage capacity of approximately 40 tons. The proppant holding container 1106 has a lower surface that forms a hopper 1120 with a discharge opening (or outlet) 1122 at its bottom. In some implementations, the discharge opening 1122 at the bottom of the hopper 1120 is gated or otherwise controllable (e.g., with a valve or the like) to regulate the flow of proppant out of the proppant holding container 1106.

The pneumatic conveying system 1108 has multiple air blower assemblies 1126, each of which is configured to provide pressurized air inside the pneumatic conveying system 1108 for conveying proppant that has been released from the proppant holding container 1106 to the system discharge 1109 and beyond. Each air blower assembly 1126 has an intake air filter 1141, which is connected in series to an intake silencer 1143, which is connected in series to a blower 1145, which is connected in series to an outlet silencer 1147. The blowers 1145 are driven by prime movers, which, in the illustrated implementation, are electric motors. More specifically, the pneumatic conveying system 1108 in the illustrated implementation has three such air blower assemblies 1126.

In each air blower assembly 1126, the blower 1145 draws air into the system from the environment through the air filter 1141 and the air intake silencer 1143. The air filter 1141 filters the air entering the system 1100 to help ensure that the air passing into and through the blower 1145 and the system 1100 will be relatively free of contaminants.

The intake air silencer 1143 in each blower assembly 1126 helps reduce any air borne noise produced by the blower 1145. If the blower 1145 is a rotary positive displacement blower, for example, as the blower's impeller rotates, air is sucked into the blower, drawing slugs of air into the system 1100 at a frequency that depends on the speed and number of lobes in the impellor. The intake air silencer 1143 in this instance may serve to smooth out these slugs of air and reduce the noise emanating from the blower inlet.

The blower 1145 in each blower assembly 1126 can be virtually any kind of mechanical component that can move air. In a typical implementation, the blower 1145 is a positive-displacement blower, such as a rotary blower or a reciprocating blower. A rotary-type blower may use internal gears, screws, shuttle blocks, flexible vanes or sliding vanes, circumferential pistons, flexible impellers, helical twisted roots, or liquid-ring pumps, for example, to move the air. A reciprocating-type blower may be a piston pump, plunger pump, or diaphragm pump. Other configurations for the blower 1145 are possible as well.

The outlet silencer 1147 in each blower assembly 1126 can serve to reduce pressure pulses and generally smooth out air flow from the blower. If a blower 1145 is a rotary positive displacement blower, for example, the blower 1145 generally discharges air in compressed slugs that can be destructive to equipment downstream of the blower 1145. The outlet silencer 1147 helps reduce these pulsations, and smooth out the resulting air flow.

In various implementations, providing the system 1100 with multiple air blower assemblies 1126, as shown, provides a degree of redundancy in the system 1100. Alternatively, in some implementations, more than one of the air blower assemblies 1126 may be operated together, simultaneously, to increase the conveying capacity of the pneumatic conveying system 1108. In a typical implementation, the air blower assemblies 1126 are connected to the discharge 1109 (which in the illustrated implementation is the distal open end of a pipe) via a network of pneumatic channels, which may include pipes, hoses, and/or valves, for example.

The discharge 1109 can be connected to an external proppant delivery channel (not shown), which may be a pipe, tube, hose, etc. that can carry the proppant to a nearby silo, blender hopper, or some other on-site storage or proppant treatment container. Typically, this external proppant delivery channel would be routed to an inlet at or near the top of the silo, blender hopper, or other container. The inlet to the silo, blender hopper, or other container would usually be significantly higher than the discharge 1109 of the system 1100. Thus, the conveying capacity of system 1100 is high enough to convey the proppant to that higher point.

The proppant holding container 1106 discharges proppant from the discharge opening 1122 at the bottom of the hopper 1120. The discharged proppant passes through the air lock 1124 and into the pneumatic conveying system 1108. In general, the air lock 1124 can be any mechanical component or combination of mechanical components that allows proppant to flow out of the proppant holding container 1106 and into the pneumatic conveying system 1108, without compromising or significantly compromising the pressure differential between the proppant holding container 1106 and the pneumatic conveying system 1108.

There are numerous ways to implement the air lock 1124. Some of these are discussed below. However, the discussion below is not exhaustive. Other options are possible and fall within the scope of the current disclosure.

In some implementations, the air lock is a rotary-type air lock. Typically, a rotary-type air lock has a housing that defines an inlet, an outlet, and a rotor housing between the inlet and the outlet. The inlet of the air lock would be connected to the discharge opening of the proppant holding container 1106 and the outlet of the air lock would be connected to the pneumatic conveying system 1108. The rotor housing houses a centrally-disposed rotor shaft that can rotate and that supports a plurality of rotor vanes that extend radially outward from the rotor shaft. These rotor vanes are usually regularly spaced around a perimeter of the rotor shaft. Each vane is sized so that its distal end will be very close to, or in contact with, the inner surface of the rotor housing. The rotor shaft may be driven by a small engine or motor (e.g., electric, pneumatic, hydraulic, etc.) or any type of rotational drive. During operation, the engine or motor, for example, turns the rotor shaft, which causes the rotor vanes to rotate thereabout. Granular proppant falls, by gravity, into the inlet, and the rotating rotor vanes move the granular proppant in a downward direction into the pneumatic conveying system 1108 beneath the rotary air lock. At the same time, the close proximity or contact of the vanes to the inner surface of rotor housing help prevent pressurized air from the pneumatic conveying system 1108 from escaping through the rotary air lock and into the proppant holding container 1106. Thus, granular proppant is moved from the lower pressure proppant holding container 1106 into the higher pressure pneumatic conveying system 1108 without compromising the pressure differential therebetween.

In some implementations, the air lock is a screw-type air lock. One example of a screw-type air lock is a Meyer pneumatic screw pump, available from the Meyer Industrial Solutions company. A pneumatic screw pump is an airlock that uses a screw auger to move the proppant from a gravity feed hopper into a pneumatic conveying system. A pneumatic screw pump typically utilizes the conveyed material itself (e.g., the proppant) to form a seal between the lower pressure proppant holding container and the higher pressure pneumatic conveying system. In some implementations, the pneumatic screw pump may have a gate valve (e.g., a flap-style gate valve downstream of the screw auger) to help prevent blow-back (e.g., the screw pump is being primed and/or when the screw pump runs on empty).

In some implementations, the air lock may include gate lock valves configured, for example, in a manner described in section 3.5 of the *Pneumatic Conveying Design Guide*, by David Mills, Second Edition. The *Pneumatic Conveying Design Guide* is hereby incorporated by reference in its entirety herein. An air lock that incorporates gate lock valves typically includes two (or more) gate lock valves that alternately open and close to permit proppant to pass from the proppant holding container to into the pneumatic conveying system. Pressurized air that passes through the lower gate from the pneumatic conveying system may be vented so that it does not interfere with the material about to flow through the upper gate. These gates may be driven in any number of ways including, for example, by motor, cam or air cylinder, or gravity. The gate valves may be virtually any kind of gate valves. One such example is a pneumatic ceramic rotary gate valve, available from Henan Quanshun Flow Control Science & Technology Co., Ltd. Other variations are, of course, possible as well.

In various implementations, the air lock may be configured in any other manner that is disclosed in the *Pneumatic Conveying Design Guide*, including, for example, those described in section 3.2, entitled "Rotary Valves" of the *Pneumatic Conveying Design Guide*.

Figure 9:
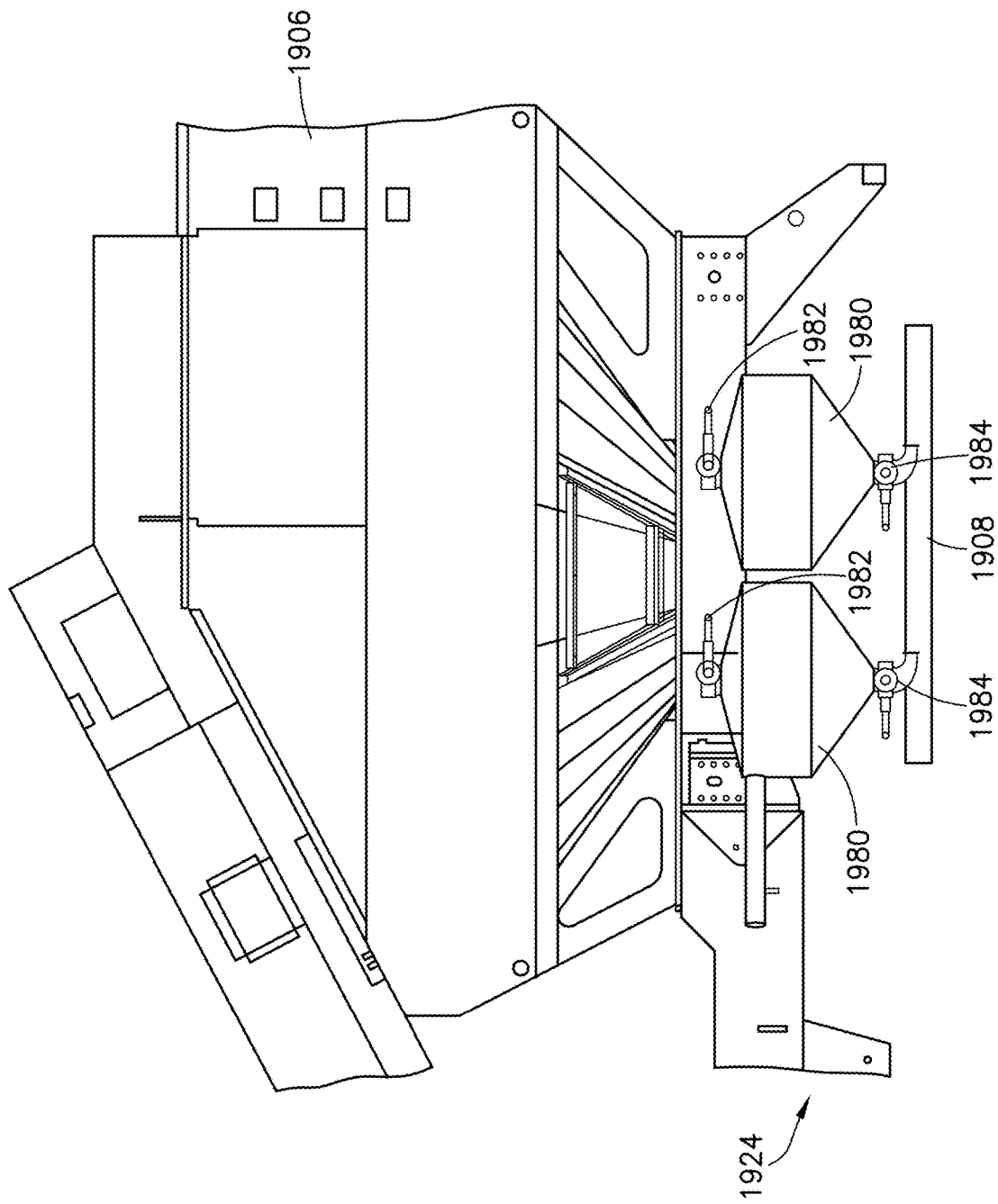
FIG. 9 is a side view showing an implementation of an air lock (that includes dual pressure tanks or pods that can be operated in sequence) between a proppant holding container and a pneumatic conveying system.
Figure 10:
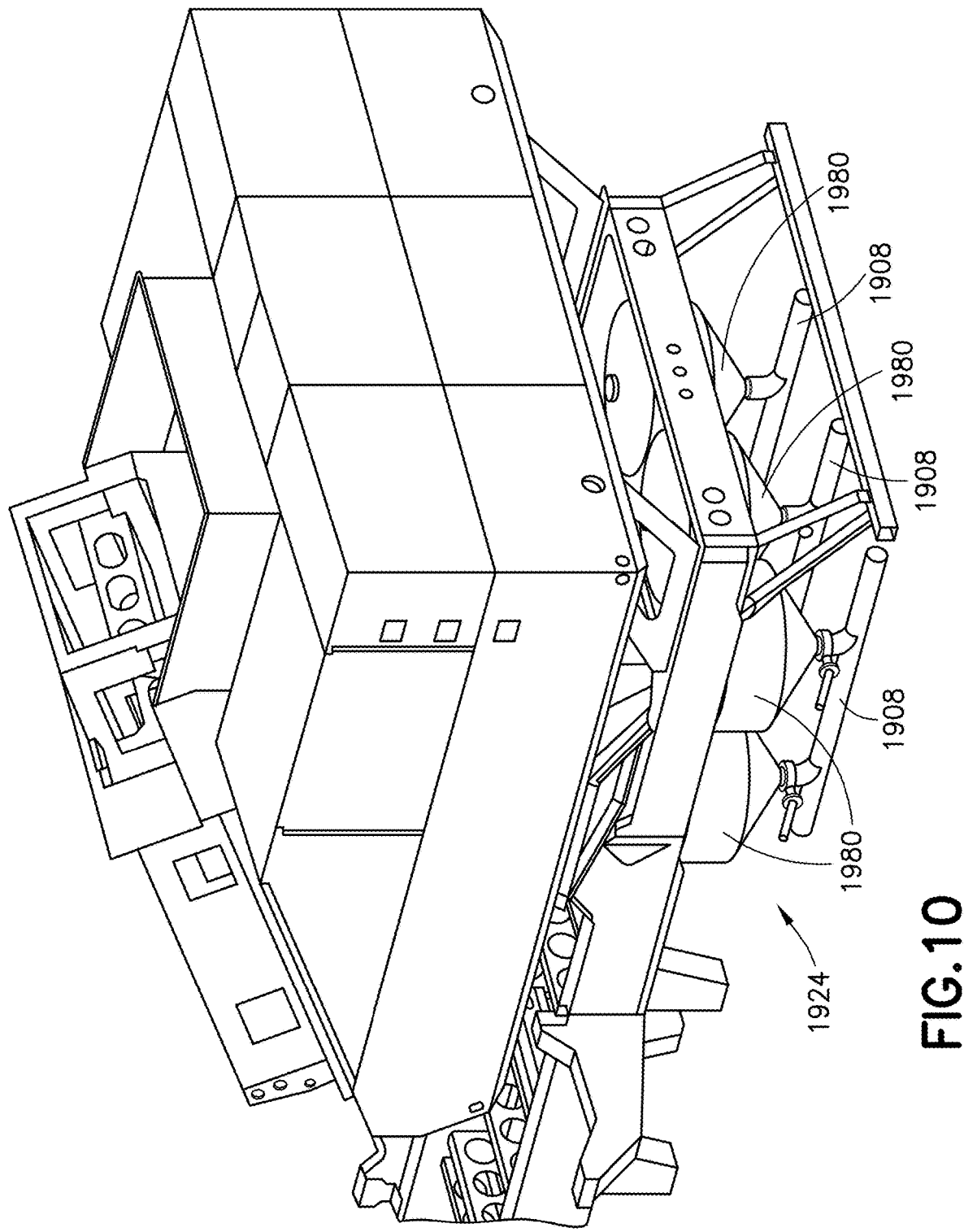
FIG. 10 is a perspective view showing an implementation of an air lock between a proppant holding container and a pneumatic conveying system.
Figure 11:
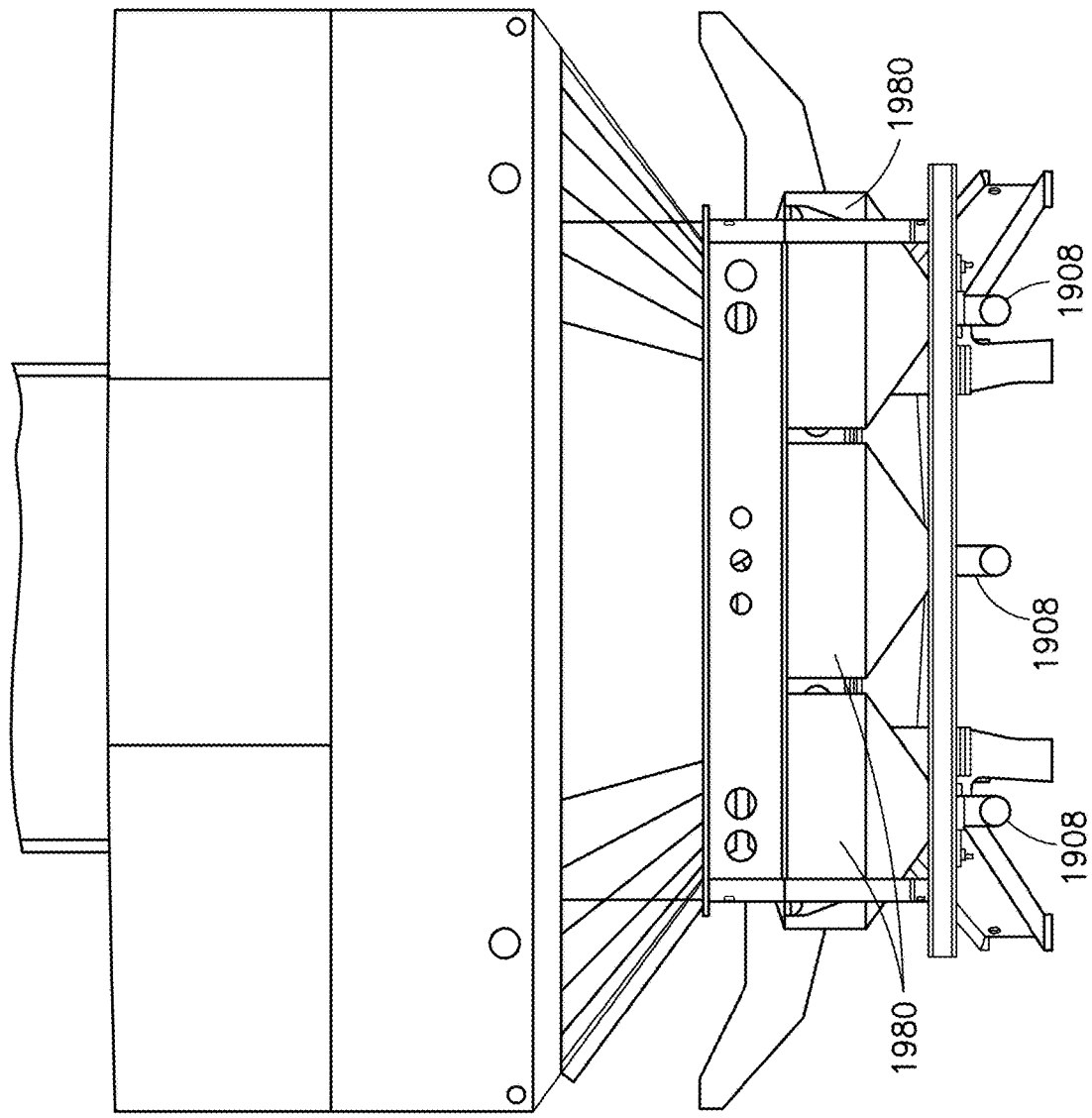
FIG. 11 is a rear view showing an implementation of an air lock between a proppant holding container and a pneumatic conveying system.

FIGS. 9-11 show an alternative implementation of an air lock 1924 between a proppant holding container 1906 and a pneumatic conveying system 1908. The illustrated air lock 1924 has multiple pressure tanks 1980, each of which has an upper inlet valve 1982 and a lower outlet valve 1984. The inlet valve 1982 controls the flow of proppant from the proppant holding container 1906 into the associated tank 1980. The outlet valve 1984 controls the flow of proppant from the tank 1980 into a corresponding conveying line of the pneumatic conveying system 1908. The system also has air lines 1986 that can feed pressurized air into the tanks 1980.

In various implementations, the air lock 1924 may have single or multiple valves. One design iteration uses dual inlet and outlet valves. The purpose is that the upper valve in each pair is used to control the flow of proppant and the lower valve in each pair controls air flow. The valves have offset open and close functions so that the valve which seals airflow operates without the flow of sand occurring. This arrangement helps promote lifespan of the critical air-seal function. For example, if you close the upper valve first and stop the flow of proppant and then wait to operate the lower valve until the sand has flowed through it, it can close without cutting through the column of flowing sand. Advantageously, with the use of dual valves, the top valve cuts and stops the flow of sand and the lower valve closes free of sand and thus the seal will last a lot longer.

The illustrated implementation has three conveying lines and six pressure tanks 1980. Each pressure tank 1980 is connected via its inlet valve 1982 to the proppant holding container 1906 (e.g., typically to a hoppered outlet at the bottom of the container 1906). Moreover, each pressure tank 1980 is connected via its outlet valve 1984 to one of the conveying lines. Additionally, each conveying line is connected to two of the pressure tanks. During operation, in a typical implementation, each tank 1980 draws sand from the proppant holding container through its inlet valve (or gate) which controls the flow of proppant into the tank. Once full, the inlet valve for that gate is closed. Then, the tank may be "topped off" with pressurized air—delivered from an on-system air compressor, for example—to increase the pressure within the tank to the same pressure as the conveying line, or higher. Then, the outlet valve 1984 for that tank 1980 is opened to allow the pressurized proppant to flow into the conveying line (and out to a silo, for example). Once the tank 1980 has been emptied, the outlet valve 1984 for that tank can be closed. Then, the pressure within the tank 1980 is vented and the inlet valve 1982 can be opened again. In this regard, the system may include a vent line from each tank 1980 to allow the tank to discharge pressure prior to opening the inlet for filling. In some instances, the vent line may be connected to the dust collector In a typical implementation, the air lock 1924 may be operated by filling one tank 1980 that is attached to a particular conveying line, while unloading the other tank 1980 that is attached to that conveying line. This helps achieve more constant flow of proppant out of the system. One or more than one conveying lines may be operational to convey proppant at any given time. Moreover, the opening and closing of the valves, the introduction of air into the tanks, etc. may be performed automatically by a system controller.

The illustrated system has three conveying lines, with two tanks 1980 per conveying line. This, however, can be varied considerably. For example, in some implementations, a system might include only one tank 1980 and one conveying line. In some implementations, a system might include any number of tanks 1980 with only one conveying line. In some implementations, a system might include only one tank 1980 per conveying line, but more than one conveying line. Essentially, any combination of tanks and conveying lines may be included in a particular implementation.

Returning to FIGS. 1-8, the system 1100 shown there also has an electrical generator set 1429 on a raised platform 1421 near the front end of the chassis 101. The electrical generator set 1429 may be virtually any set of components (e.g., diesel engine with an electrical generator) configured to produce electrical energy that can be used by one or more of the various components (e.g., lights, blowers, controls, etc.) in the system 1100. In some implementations, in fact, the electrical energy produced by the electrical generator set 1429 may be used to power motor(s) for the air blower(s) 1145, motor(s) for the air lock(s), and/or the ramp panels, etc. IN a typical implementation, the system 1100 includes a fuel tank as well. The fuel tank also may be mounted on the raised platform, near or integrated into the electrical generator set 1429. The fuel tank supplies fuel to the internal combustion engines (typically via one or more fuel pumps).

The electrical generator set 1429 feeds the electrical energy it generates to a power distribution panel 1427, which distributes the electrical energy to any electrically-powered components in the system 1100.

The system 1100 also has an operator control panel 1425. The operator control panel 1425 can have any one of a variety of different configurations. However, in a typical implementation, the operator control panel 1425 would include all of the controls that a system operator would need access to in order to operate the system 1100. This might include controls for the electrical generator set 1429, controls for the pneumatic conveying system 1108 (including each air blower 1145), controls for the mechanical conveying system 1104, controls for the air lock(s) 1124, etc.

The system 1100 has jacks 1123 attached to the chassis 1101 and extended in a downward direction. The jacks 1123 can be retracted so that the system 1101 can be moved (e.g., hauled by a hauling vehicle). The jacks 1123 can be extended to lift the system 1101, when the system is intended to remain stationary.

In use, the system 1100 can be hauled with a hauling vehicle to a worksite that includes one or more silos for storing proppant. While being hauled, the system 1100 rolls behind the hauling vehicle on its wheels 1105. Also, while being hauled, the jacks 1123 are in raised positions and the ramp panels 1131 are as well (as shown in FIG. 5-8). When the system 1100 reaches the worksite, the jacks can be extended and the system 1100 decoupled from its hauling vehicle.

Next, the ramp panels 1131 can be lowered to the positions shown in FIGS. 1-4. In the lowered position, the ramp panels 1131 extend in an outward, slightly downward direction so that their distal ends touch the ground.

Next, a bottom dump delivery vehicle drives on the ramp panels to position its bottom dump discharge port above the upward-facing aperture (or opening) 1137. The operator turns on the mechanical conveying system 1108 and opens the bottom dump discharge port over the aperture 1137. Proppant begins pouring into the aperture 1137, through the grating 1139. The proppant is carried by the mechanical conveying system 1104 into the proppant holding container 1106.

A hose, or the like, is attached to the discharge 1109 of the pneumatic conveying system 1108 and routed into one of the on-site silos. The pneumatic conveying system 1108 and the air lock(s) 1124 are started. Then, the proppant is released (e.g., by opening a valve) from the proppant holding container 1106. The proppant passes through the air lock and into a conveying line of the pneumatic conveying system 1108, which carries the proppant through the conveying line, then through the hose to the on-site silo.

Figure 12:
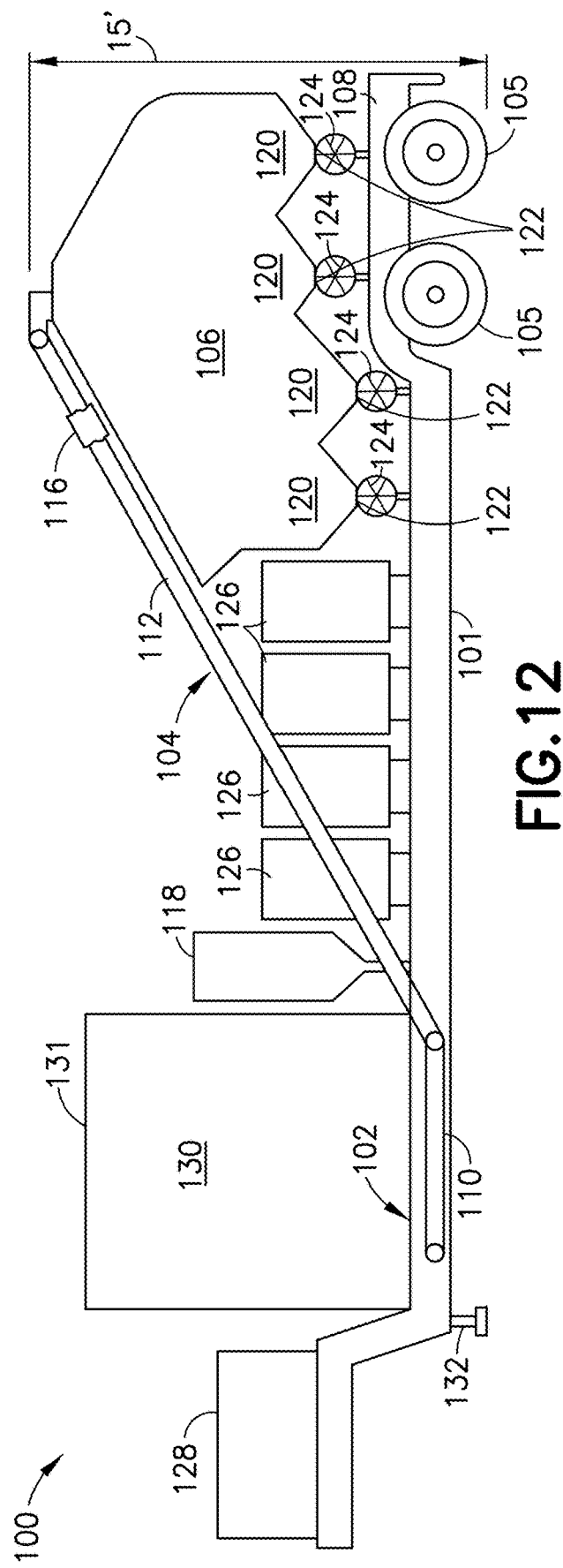
FIG. 12 is a schematic side view of another implementation of a material (e.g., proppant) handling system.
Figure 13:
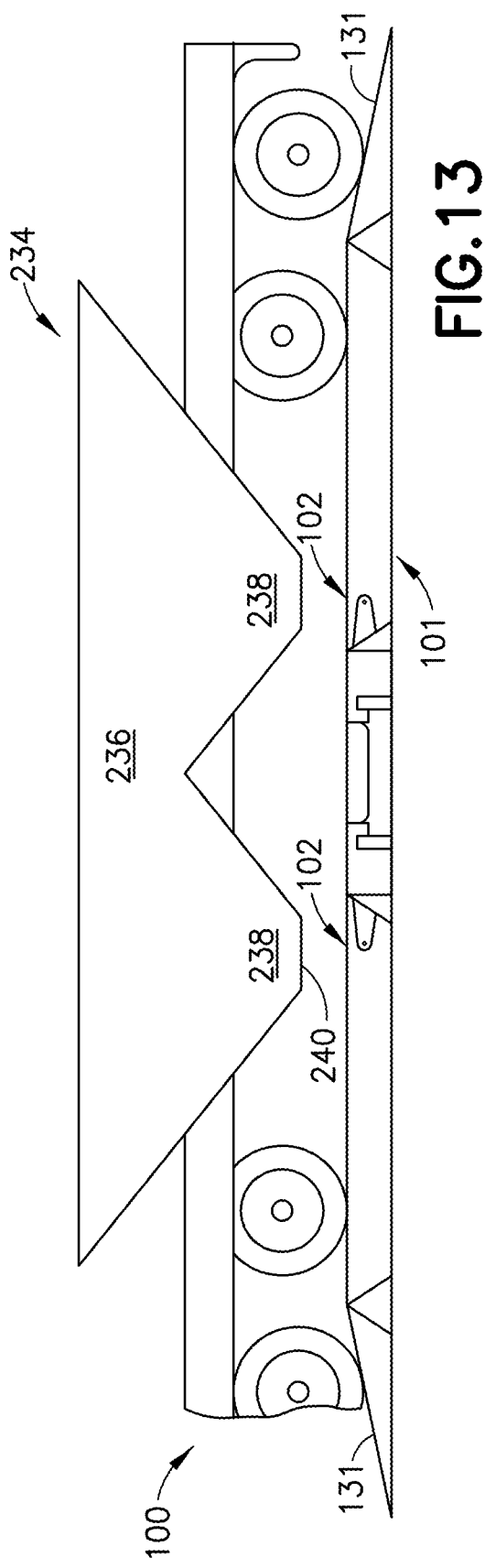
FIG. 13 is a partial, schematic, front view of the system in FIG. 12 with ramp panels of the drive over ramp assembly in a deployed configuration, and a delivery vehicle positioned atop the drive over ramp assembly.
Figure 14:
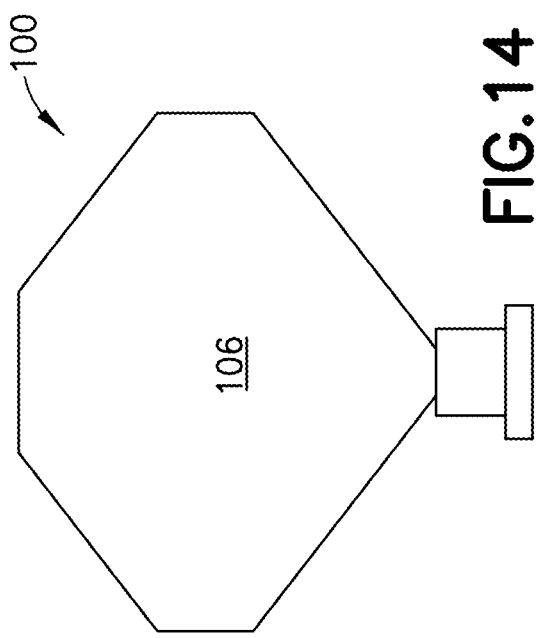
FIG. 14 is a partial, schematic rear view of the system of FIG. 12.

FIGS. 12-14 show another example of a material handling system 100 that can be used at a worksite to conveniently transfer proppant, for example, from a gravity feed source (e.g., a trailer, proppant delivery container, etc.) into a silo or other storage container onsite, pneumatically.

If the illustrated system 100 is available at a particular worksite that has one or more silos, then proppant can be easily conveyed into any of those silos, pneumatically, regardless of how the proppant was delivered to the worksite (i.e., whether the delivery was by pneumatic trailer, by gravity feed trailer, by one of the proppant delivery containers mentioned above, or by some other means). Moreover, the material handling system 100 is portable and, therefore, can be moved around the worksite with relative ease to deliver the proppant into any one of the one or more silos. Of course, this portability makes the material handling system 100 easy to stow away as well.

Like the system 1100 in FIGS. 1-8, the system 100 in FIGS. 12-14 is relatively simple in design and operation and highly portable.

In the illustrated implementation, the system 100 has a chassis 101 on wheels 105. The chassis 101 can be connected to a truck or other vehicle for hauling around as desired or needed. All other system components shown in the illustrated implementation are mounted, either directly or indirectly, onto and, therefore, supported by the chassis 101.

The illustrated system 100 has two proppant unloading stations 102, two mechanical conveying systems 104, a proppant holding container 106, and a pneumatic conveying system 108.

Each proppant unloading station 102 is configured to receive proppant from above (e.g., via gravity drop from a bottom dump trailer or container positioned above the proppant unloading station 102). Each proppant unloading station 102 includes a portion of one of the mechanical conveying systems 104 that is exposed from above so that when a proppant delivery vehicle, for example, is positioned above the proppant unloading station 102, the proppant delivery vehicle can bottom dump proppant onto the mechanical conveying system 104 for mechanical conveying.

Each mechanical conveying system 104 is configured to convey proppant from an associated one of the proppant unloading stations 102 to an opening in the proppant holding container 106. The pneumatic conveying system 108 is configured to pneumatically convey proppant from the proppant holding container 106 to one or more off-system destinations (e.g., a silo, blender hopper, etc.).

The chassis 101 in system 100 is a rigid structure made up of high strength, typically metallic, beams that may be welded together to form a structure or frame to support various other system components, as shown. The chassis 101 is coupled to wheels 105 and typically includes provisions for hitching the chassis 101 to hauling vehicle. In some implementations, the chassis 101 may have one or more rigid plates mounted on the frame structure as well. The chassis 101 in the illustrated implementation defines an opening or space, through which the proppant can be dropped from a delivery vehicle or container into the system 100 at the proppant unloading station 102.

Each mechanical conveying system 104, in the illustrated implementation, has a first powered belt conveyor 110 and a second powered belt conveyor 112. Each powered belt conveyor 110, 112 has a pair of pulleys and a belt coupled to the pulleys. In a typical implementation, the pulleys may be driven by prime movers, such as electric motors, etc. In some implementations, there is a single, continuous belt conveyor that has both a lower horizontal and upper angled portion.

Each first powered belt conveyor 110 extends from the proppant unloading station 102, in a rearward, substantially horizontal direction to a second powered belt conveyor 112. Each second powered belt conveyor 112 is very close to an end of its corresponding first powered belt conveyor 110 and configured such that proppant that is carried by the first powered belt conveyor 110 will be passed along to or dropped onto the second powered belt conveyor 112. In some implementations, the second powered belt conveyor could be a conveyor with a bend in it so that it has one horizontal section which transitions into a sloped/elevated section. Each second powered belt conveyor 112 extends away from the first powered belt conveyor 110 in a rearward, upwardly angled direction to a conveyor system discharge 114 that discharges, according to the illustrated implementation, into the top of the proppant holding container 106.

The specific upward angle of each second powered belt conveyor 112 will depend on the specific geometry of the system 100. In some implementations, however, the upward angle may be between about 10 to 45 degrees (or more preferably between about 20 to 30 degrees) from the longitudinal axis of the chassis 101. In one exemplary implementation, the upward angle is 28 degrees.

Each mechanical conveying system 104 has a housing 116 (that may be built-in) that covers portions of the first powered belt conveyor 110 and that covers the second powered belt conveyor 112. This housing 116 helps contain any dust that may be generated by proppant moving along on the conveyor belts of the mechanical conveying system 104. There is an opening in the housing 116 above the first powered belt conveyor 110 at the proppant unloading station 102. It is through this opening that the proppant can be delivered into the system 100.

Each mechanical conveying system 104 has a dust collector 118 that is coupled to (and that may be built-into) the housing 116 of the mechanical conveyor system 104. The dust collector 118 is generally configured to draw air and dust out of housing 116 for the mechanical conveyor system 104, via vacuum. The dust collector 118 may be a closed loop dust collection system like the dust collector in the Quickload 300™ transloading system, available from the Smart Sand, Inc. Company.

In some implementations, each dust collector creates a low pressure, or vacuum, in the housing 116 of its mechanical conveying system 104. In some implementations, this low pressure, or vacuum, may help draw proppant into the system 100 at the corresponding proppant unloading station 102.

The upper end of the housing 116, in the exemplary implementation shown in FIG. 12, bends slightly downward and extends into the top of the proppant holding container 106. The second powered belt conveyor 112 ends near this point so that the proppant carried up the second powered belt conveyor 112 will fall off the end of the second powered belt conveyor 112 and into the proppant holding container 106.

The proppant holding container 106 is a large, hollow, rigid container. In one implementation, the proppant holding container 106 has a storage capacity of approximately 43 tons. The proppant holding container 106 has a lower surface that forms a plurality of hoppers 120 (e.g., three), each of which has a corresponding discharge opening (or outlet) 122 at its bottom. The specific implementation shown in FIG. 12 has four hoppers formed in the bottom of the proppant holding container 106, and the hoppers are aligned with one another front-to-back. In some implementations, the discharge opening 122 at the bottom of each hopper 120 may be gated or otherwise controllable to regulate the flow of proppant out of the proppant holding container 106.

The discharge opening 122 at the bottom of each hopper 120 is connected to an air lock 124. Each air lock includes one or more mechanical components configured to allow the movement of proppant from the proppant holding container 106 into the pneumatic conveying system 108, without compromising the pressure differential between the proppant holding container 106 and the pneumatic conveying system 108. The air locks 124 can be or include virtually any kind of mechanical component or combination of mechanical components that can perform the foregoing air lock functionalities. For example, the air locks 124 can be screw-type air lock, rotary air locks of the kind that are used for discharging solid material from hoppers, bins, etc. into pressure or vacuum-driven pneumatic conveying systems.

During operation, proppant flows out of the proppant holding container 106, through one or more of the air locks 124, and into one or more proppant conveying channels (not shown in FIG. 12) of the pneumatic conveying system 108.

The pneumatic conveying system 108 has three air blowers 126 that are configured to blow air into one or more proppant conveying channels. In some implementations, the pneumatic conveying system 108 has a system of valves that facilitate connecting the various air blowers 126 to various proppant conveying channels. Each proppant conveying channel has a system output that can be connected to an external proppant delivery pipe or tube (not shown). In a typical implementation, the external proppant delivery pipe or tube may be routed to an off-system silo, a blender hopper, or other container.

The air blowers 126 are driven by prime movers. The prime movers can be internal combustion engines, electric motors, etc. In one exemplary implementation, each air blower 126 has a capacity between about 800 and 1180 cubic-feet per minute and is driven by a 100-horsepower diesel engine. In an exemplary implementation, the system 1100 may be configured to deliver 0.5-0.6 tons per minute with three air blowers and three airlocks. In some implementations, the air blowers 126 may be driven by electric motors powered by an electrical generator set, which may be supported on the chassis (e.g., on a front trailer gooseneck). There is a fuel tank 128 mounted on a raised section of the chassis 101 near the forward end of the chassis 101. The fuel tank 128 is configured to supply fuel to the internal combustion engines that drive the air blowers 126. In some implementations, the fuel tank 128 may be configured to provide fuel to operate an electrical generator (not shown) and/or one or more engines to drive the air lock(s) and/or other components of the system 100.

The system 100 has a drive-over ramp assembly 130. The drive-over ramp assembly 130 has a pair of ramp panels 131. Each ramp panel 131 extends from a hinged connection along a lateral edge of the chassis 101. The ramp panels 131 are movable, about its hinged connection, between a stowed (or transport) position (shown in FIG. 12) and a deployed position (shown in FIG. 13). In the stowed (or transport) position (shown in FIG. 12), the ramp panels 131 extend in a substantially upward direction. In the deployed position (shown in FIG. 13), the ramp panels 131 extend laterally outward and downward so that their distal edges rest on the ground, thereby forming a ramp, over which a proppant delivery vehicle (see, e.g., FIG. 13) can drive. When the proppant delivery vehicle (with one or more bottom delivery chutes, shown in FIG. 13) has driven onto the ramp, the bottom delivery chute(s) of the proppant delivery vehicle can be aligned with (and positioned directly above) the proppant unloading station(s) 102. In some implementations, the ramp panels 131 are moved by one or more electrical motors and/or hydraulically (or otherwise).

In some implementations, the ramps (ramp panels) could be made as separate units which get placed in position (as shown in FIGS. 1-4, for example) at the worksite via a forklift, for example. The ramps do not necessarily need to be part of single physical unit with the rest of the system components.

In some implementations, the system 100 may include a rigid framework (not shown in FIGS. 12-14) supported by, or integrated into, the chassis 101 that is configured to receive and support a proppant delivery container, such as those available from SandBox Logistics™ or the like above the proppant unloading station(s) 102. This framework may be provided instead of, or in addition to, the drive over ramp assembly 130. In implementations that include this kind of framework, the proppant delivery container may arrive at the worksite on a delivery trailer, lifted off of the trailer with a forklift, for example, and then placed directly onto the framework for gravity unloading directly into the system 100. Once emptied, the proppant delivery container may be lifted, again by forklift, and put onto a truck to be taken away, or placed somewhere else for temporary storage until it is ready to be hauled away.

The system 100 shown in FIGS. 12-14 is supported on the ground by wheels in the rear and by a separate support element 132 in the front.

FIG. 13 is a partial, schematic front view of the system 100 in FIG. 12 showing the ramp panels 131 of the drive over ramp assembly 130 in a deployed configuration, and a proppant delivery vehicle 234 positioned atop the drive over ramp assembly 130. FIG. 13 shows that the two proppant unloading stations 102 are located on opposite lateral side of the chassis 101.

In the deployed configuration, the ramps of the drive over ramp assembly 130 extend in a laterally outward and slightly downward direction from the chassis 101. The distal edge of each ramp is in contact with the ground upon which the system 100 is located. Thus, it can be seen that the drive over ramp assembly 130, when deployed, forms a ramp that a proppant delivery vehicle (e.g., 234) can drive up from one side (to the position shown in FIG. 13) and down on the other side.

The exemplary proppant delivery vehicle 234 in FIG. 13 has a proppant storage container 236 with a bottom surface having two hopper sections 238, each of which has a discharge opening 240 at its bottom. With the proppant delivery vehicle 234 positioned atop the drive-over ramp assembly 130, as shown, each discharge 240 aligns with one of the proppant unloading stations 102.

In one exemplary implementation, each engine-blower air lock unit will convey about 0.6 of a Ton/minute. So, 4 can convey up to 2.4 tons/minute for the entire unit. Moreover, in an exemplary implementation, the design consists of 53 ft. trailer with a drive over 48 inch (or 36 inch) wide belt conveyor with fold out drive over ramps, an approximately 43 ton storage hopper, a conveyor unload rate into the storage compartment of approximately 8 tons/minute, with three rotary air locks mounted to the hoppered storage compartment, and three approximately 100 HP diesel engines driving 900 cfm blowers, available from Gardner Denver (screw type tend to be much quieter and more dependable) and a small hydraulic pump to drive the rotary air lock(s). Moreover, the design can include hydraulic dolly legs to lower the trailer to the ground in order to facilitate the drive over ramp functionality. The system width is approximately 12 feet and its height is approximately 14 feet. These are transport dimensions, not working dimensions. Each blower is connected to a rotary drop out air lock. This provides redundancy, so that if one engine or airlock fails, two others would be interchangeable with each other.

Adding multiple blowers and airlocks provides modular addition of transfer rate which increases incrementally to suit requirements of the user.

Figure 15:
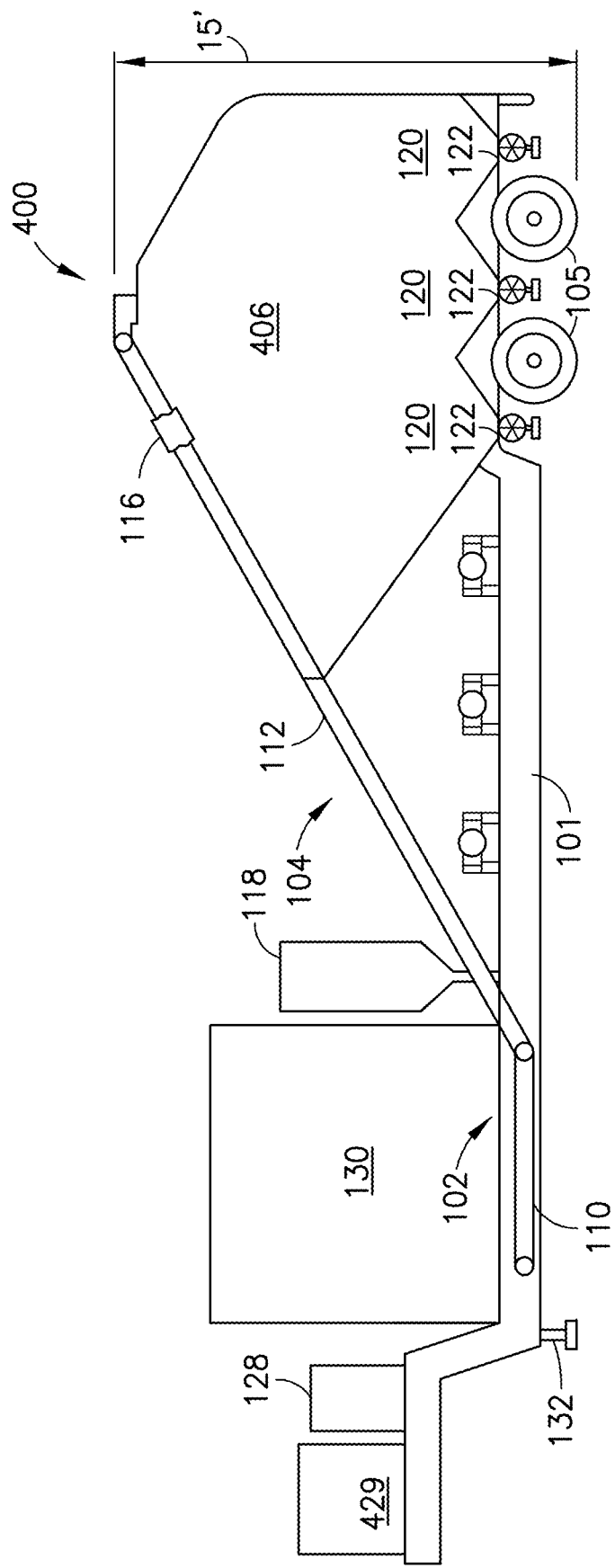
FIG. 15 is a schematic side view of yet another alternative implementation of a material (e.g., proppant) handling system.
Figure 16:
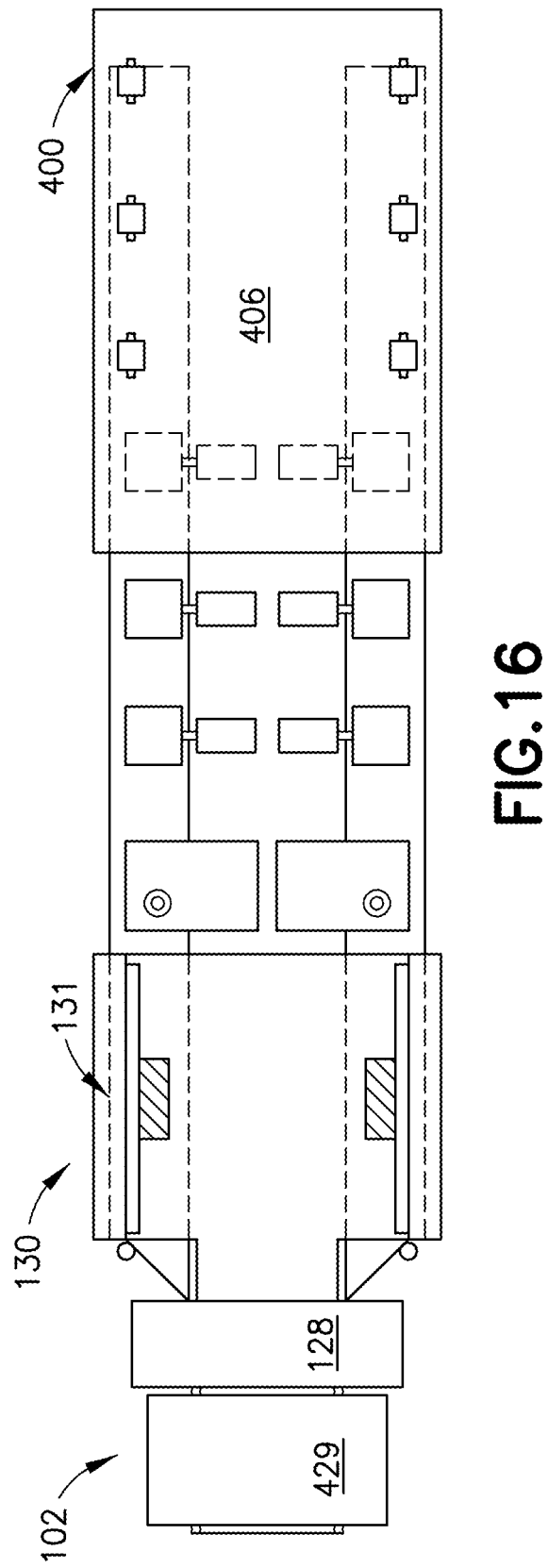
FIG. 16 is a schematic, top, partial section view of the system in FIG. 14.
Figure 17:
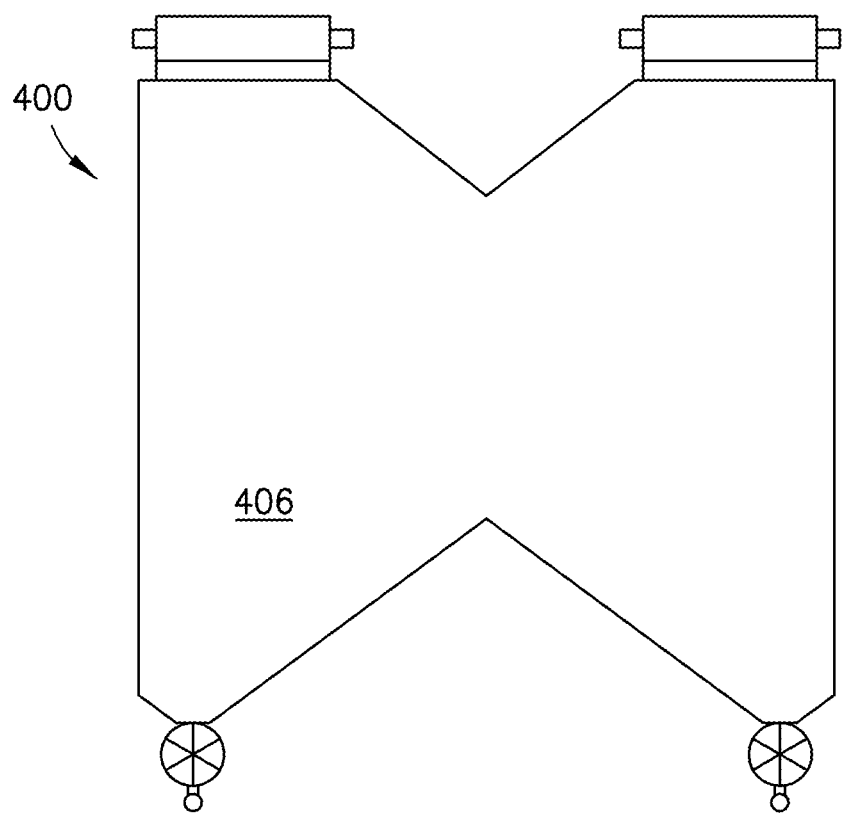
FIG. 17 is a partial, schematic rear view of the system of FIG. 14.

FIGS. 15-17 show an alternative proppant handling system 400 that can be used at a worksite to conveniently transfer proppant from a gravity feed trailer or proppant delivery container into a silo or other storage container onsite, pneumatically.

The proppant handling system 400 in FIGS. 15-17 is similar in some ways to the proppant handling system 100 in FIGS. 12-14. For example, the proppant handling system 400 in FIGS. 15-17 has two proppant unloading stations 102, two mechanical conveying systems 104, a proppant holding container 106, and a pneumatic conveying system 108. Each proppant unloading station 102 is configured to receive proppant from a gravity feed trailer or container positioned above the proppant unloading station 102. Each mechanical conveying system 104 is configured to convey proppant from an associated one of the proppant unloading stations 102 to an opening in the top of the proppant holding container 106. The pneumatic conveying system 108 is configured to pneumatically convey proppant from the proppant holding container 106 to one or more off-system destinations (e.g., a silo, blender hopper, etc.).

The proppant handling system 400 in FIGS. 15-17 differs from the proppant handling system 100 in FIGS. 12-14 in at least a few notable ways.

First, for example, the number and specific arrangement of components in the proppant handling system 400 is different than the number and specific arrangement of components in the proppant handling system 100 in FIGS. 12-14. More particularly, in system 400, there are six air blowers 126 and six air locks 124. The six air blowers 126 are arranged with three on each lateral side of the chassis 101. Each air blower 126 is driven by an electrical motor. Likewise, the six air locks 124 are arranged with three on each lateral side of the chassis 101. The proppant holding container 406 in system 400 has a lower surface that forms six hoppers 120, each of which has a corresponding discharge opening (or outlet) 122 at its bottom, and each of which is aligned with (and connected to) a corresponding one of the air locks 124.

In various implementations, the system 400 will include valves that enable any one of the six air blowers 126 and six air locks to be connected to the same pneumatic conveying channel(s).

An another example of how the proppant handling system 400 of FIGS. 15-17 differs from the proppant handling system 100 of FIG. 12-14, is that the proppant handling system 400 has an electrical generator set 429 together with the fuel tank 128, on a raised section of the chassis 101 near the forward end of the chassis 101. The fuel tank 128 supplies fuel to an internal combustion engine of the electrical generator set 429. The electrical generator set 429 produces electricity that can be used to power any one or more of the other system components, including, for example, the air blowers 126, the air lock(s), the ramp panels, etc.

In some implementations, the proppant pneumatic transfer rate of the system 400 is in the 3.6 ton per minute range with approximately 70 tons of storage. This equals about 20 minutes of sand conveying if trucks are not available; or equivalently a 28 ton truck load may be unloaded in less than 8 minutes.

Figure 18:
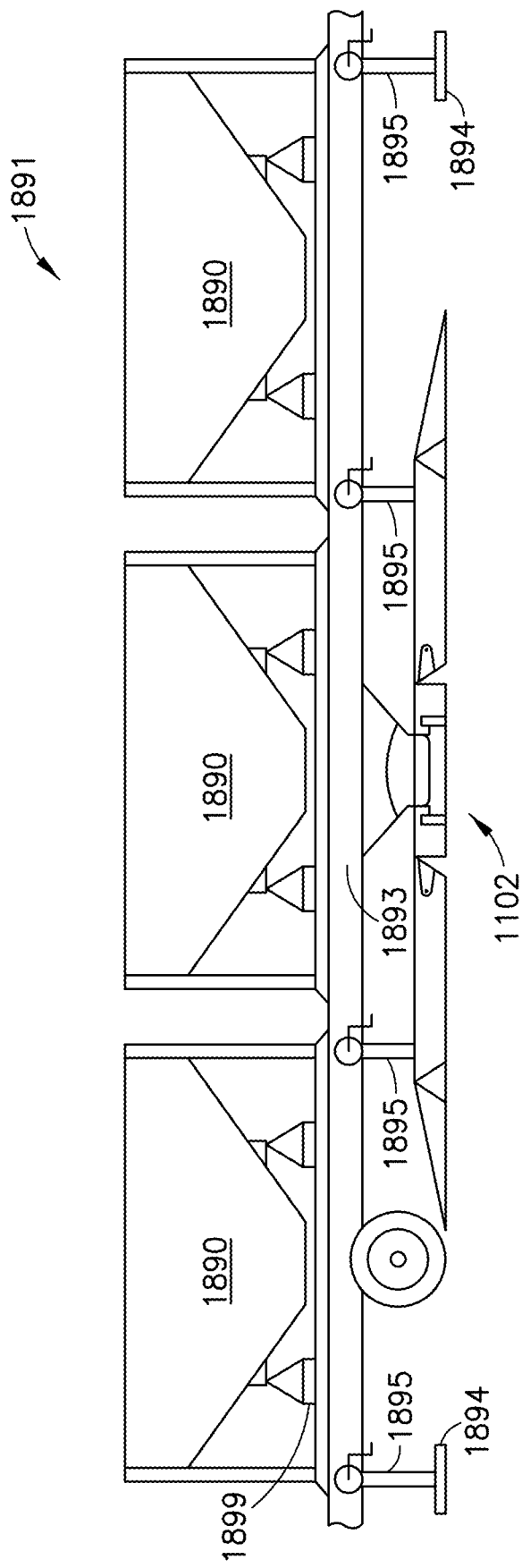
FIG. 18 is a schematic front view showing an implementation of an unloader kit for unloading a proppant delivery container.

FIG. 18 shows an unloader kit 1891 for unloading a proppant delivery container, such as a container made by the SandBox Logistics™ Company, into a system like the ones disclosed herein. More specifically, the illustrated implementation shows three such proppant delivery containers 1890. Each proppant delivery container has a bottom surface that defines pockets 1899 for a forklift to engage, so that the forklift can lift the proppant delivery container 1890 onto and off of the unloader kit 1891.

The unloader kit 1891 can be attached to a hauling vehicle and hauled. The hauling vehicle would be coupled to the front of the unloader kit 1891 (which is on the right side of the image as shown) and would roll on its axle 1892 at a rear end thereof (the left side of the image as shown). The unloader kit 1891 is shown positioned over the ramp panels and unloading station of a system (e.g., system 1100).

The unloader kit 1891 has a platform 1893 that supports the proppant delivery containers 1890 and a drive mechanism (e.g., a chain drive) that can advance the proppant delivery containers 1890 across the platform (e.g., from left to right in the illustrated implementation). The left most proppant delivery container 1890 in the illustrated implementation is a full (having been placed onto the platform without having been unloaded yet), the right most proppant delivery container 1890 in the illustrated implementation is empty (having passed the proppant unloading station 1102 and been unloaded), the center proppant delivery container 1890 in the illustrated implementation is being unloaded (into the proppant unloading station 1102 immediately below its bottom discharge port.

The illustrated platform 1893 is supported by a plurality of leveling legs 1895 (or jacks), some of which sit atop pads 1894.

In a typical implementation, the system includes a box advancing mechanism (e.g., a gearbox and motor, electric or hydraulic, that can advance the box container to the unloading and emptying positions on the box unloader kit). In a typical implementation, the kit has rollers (that the boxes can roll on, atop the platform) and a chain drive to drive a chain for moving the boxes. In some implementations, the sand box is a size of about 8 feet wide by 9 feet high, by 20 feet long.

A number of embodiments of the invention have been described. Nevertheless, it will be understood that various modifications may be made without departing from the spirit and scope of the invention.

For example, the number of system component can vary considerably from system to system. For example, in various implementations, a system might have any number (one or more) proppant unloading stations, mechanical conveyor systems, dust collectors, proppant holding containers, air locks, and/or air blowers. Moreover, the arrangement of system components on a particular chassis can vary as well. As an example, in some implementations, the proppant holding container may be positioned near the front of the chassis, with the proppant unloading station near the rear of the chassis.

The chassis can be virtually any kind of supporting frame for the other components of the material handling system described herein. It can be made of a variety of different materials or combinations of materials and have a variety of different physical configurations. Prime movers can be virtually any kind of internal combustion engines, electric motors, pneumatic motors, hydraulic motors, etc.

The air blower assemblies 1126 can have any one of a variety of different physical configurations.

Other support equipment may be included. If, for example, the ramps and/or other equipment (e.g., jacks, etc.) are hydraulically-driven, then the system would include one or more hydraulic pumps and a system for delivering pressurized hydraulic fluid from those hydraulic pump(s) to the ramps and/or other equipment.

In some implementations, the air locks may include dense phase/dilute phase pneumatic conveying technologies, including, for example, such technologies available from the Schenck Process Company. Moreover, in some implementations, the air lock may include dense phase pressure vessels, such as the dense phase pressure vessels, available from the Coperion GtnbH.

The mechanical conveyor system can include any one or more of a variety of different mechanical elements and components to mechanically convey material (e.g., the proppant) from the proppant unloading station into the proppant holding container. For example, in some implementations, the mechanical conveyor system may include any number of (one or more) conveyors. Alternatively, or additionally, the mechanical conveyor system could include one or more different types of mechanical conveyor technologies including, for example, screw conveyors, drag chain conveyors, belt conveyors, vibrating conveyors, vertical conveyors, spiral conveyors etc. and/or any combination thereof. Mechanical conveyor systems that use belts can have virtually any size belts. If the system includes only one single conveyor belt, that single belt might have a horizontal portion that extends from the unloading station to a bend and then an angled portion that extends from the bend to the top of the mechanical conveyor system.

The transfer rate or conveying rate for a particular mechanical conveyor system may vary. For example, in a system that includes a single mechanical conveyor system the transfer rate or conveying rate for that single mechanical conveyor system may be between 5 and 15 tons per minute (e.g., 10 tons per minute). Additional mechanical conveyor systems will increase the overall transfer rate or conveying rate by the transfer rate of the additional mechanical conveyor system(s). In one exemplary implementation, each air blower 1126 has a capacity of about 1000 standard cubic-feet per minute. The capacity of the air blower, and all other components of the system, can vary considerably.

The dust collector could be incorporated into the storage tank and deposit the collected dust into the tank. The vacuum system, in those implementations, would draw air from the tank and conveyor system.

The proppant holding container may have any one of a variety possible sizes (storage capacities), shapes, and styles. The proppant holding container can have any number of (one or more) hoppers-airlocks-discharges.

The ramps could be completely separate objects which are transported separately and put in place (e.g., as shown in FIGS. 5-8) for work.

In some implementations, the system disclosed herein has only one proppant unloading station, whereas in other implementations, the system disclosed herein has two (or possibly more than two) proppant unloading stations. In implementations that include only one proppant unloading station, a trailer may have to move in order to unload each trailer hopper. In implementations that have more than one proppant unloading station, the trailer may be able to unload more than one trailer hopper (one into each proppant unloading station) simultaneously. The system components can be connected, or connectable, together in any one of a variety of possible ways—to facilitate system redundancy and to facilitate ramping up (or down) system capacity. Moreover, in some implementations, one or more of the components may be physically separate from (and not mounted on the same chassis as) the other system components. For example, in some implementations, the drive over conveyor may be provided as a separate piece of equipment from the other system components. In those implementations, a mechanical conveyor would be provided to mechanically convey material from the drive over conveyor to the separate container. As another example, the blowers may be provided as a separate piece of equipment. In those implementations, the blowers would be connected to the air locks at the bottom of the storage container by pneumatic lines. In general, any system component(s) provided on a separate base (e.g., not mounted on the same chassis as the other system components) would be operationally connected into the system (and to the other system components) as shown in the drawings and otherwise described herein to the other system components. In some implementations, more than one of the system components may be provided as a physically discrete component (and not mounted on the same chassis as the other system components).

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

The systems described herein are material handling system. These systems can be used, of course, to deliver proppant (e.g., sand, treated sand, or man-made ceramic materials) designed to keep an induced hydraulic fractures open, during or following a fracturing treatment, or to deliver any one of various other types of solid materials (e.g., any bulk powder or granular material; sand, grain, cement, powdered chemicals, salt, etc.)

The system is described as being useful at a worksite (e.g., one that includes one or more hydraulic fracturing wellheads). The worksite need not have actual wellheads in place though. Instead, a worksite could be a location where fracking is intended to take place, but where not wellheads are in place yet. The worksite could also be at a temporary storage location. The worksite could also be at a material processing site. The system could work for any bulk powder or granular material; sand, grain, salt, etc.

The system described herein is portable. Portability, however, may be provided for in a variety of other ways than just those explicitly mentioned herein.

Other implementations are within the scope of the claims.

What is claimed is:

1. A material handling system comprising:
   a chassis;
   a storage container supported by the chassis;
   a conveyor system supported by the chassis and configured to convey a material from a material unloading station to a conveyor system discharge that is above an inlet of the storage container at an elevation that is higher than the material unloading station;
   a pneumatic delivery system supported by the chassis and configured to deliver the material from the storage container pneumatically; and
   a drive-over ramp assembly supported by the chassis, wherein the drive-over ramp assembly comprises at least a pair of ramp panels that, in a deployed position, are configured to physically support a material delivery vehicle that has a bottom delivery chute while the material delivery vehicle moves into a position where the material delivery vehicle can unload the material into the material unloading station by gravity through the bottom delivery chute.

2. The material handling system of claim 1, wherein the conveyor system is a mechanical conveyor system that comprises one or more powered belt conveyors.

3. The material handling system of claim 2, further comprising:
a housing for the mechanical conveyor system,
wherein the housing defines an opening at the material unloading station through which the material can be loaded into the mechanical conveyor system.

4. The material handling system of claim 3, further comprising:
a dust collector coupled to the housing for the mechanical conveyor system or to the storage container,
wherein the dust collector is configured to draw air and dust out of housing for the mechanical conveyor system or from the storage container.

5. The material handling system of claim 1, wherein the storage container has a bottom discharge, the material handling system further comprising:
an air lock coupled to the bottom discharge and to the pneumatic delivery system.

6. The material handling system of claim 5, wherein the pneumatic delivery system further comprises an air blower coupled to an outlet of the air lock.

7. The material handling system of claim 6, further comprising:
a connector for a system pneumatic discharge line coupled to the air lock and the air blower.

8. The material handling system of claim 1, wherein the drive-over ramp assembly is configured such when the material delivery vehicle with the bottom delivery chute has driven over or onto the ramp, the bottom delivery chute of the material delivery vehicle will be positioned directly above the material unloading station.

9. The material handling system of claim 1, further comprising:
a framework supported by the chassis and configured to receive and to support a material delivery container positioned directly above the material unloading station for gravity unloading from the material delivery container into the material unloading station while the material delivery container is positioned directly above the material unloading station and is supported by the framework.

10. The system of claim 1, further comprising wheels coupled to the chassis.

11. The system of claim 1, wherein the material is a powder or granular material.

12. The system of claim 1, wherein the material is a proppant.

13. The system of claim 1, further comprising the material, wherein the material is in the storage container, and being conveyed by the conveyor system, and being delivered by the pneumatic delivery system,
wherein the material is a powder or granular material.

14. The system of claim 1, further comprising the material, wherein the material is in the storage container, and being conveyed by the conveyor system, and being delivered by the pneumatic delivery system,
wherein the material is a proppant.

15. A material handling system comprising:
a chassis;
a storage container supported by the chassis;
a conveyor system supported by the chassis and configured to convey a material from a material unloading station to a conveyor system discharge that is above an inlet of the storage container at an elevation that is higher than the material unloading station; and
a pneumatic delivery system supported by the chassis and configured to deliver the material from the storage container pneumatically,
wherein the pneumatic delivery system is configured to deliver the material from the storage container to a silo at a worksite that includes one or more hydraulic fracturing wellheads for accessing liquid petroleum resources.

16. The system of claim 1, wherein each of the ramp panels is supported at a proximal end by a hinged connection along an upper lateral side edge of the chassis that enables the ramp panel to move, about the hinged connection, between the deployed position and a stowed position.

17. The system of claim 16, wherein the ramp panels, in the stowed position, extend in an upward and inward direction from the hinged connection.

18. The system of claim 16, wherein the ramp panels, in the deployed position, extend laterally outward and downward from the hinged connection so that the distal ends of the ramp panel rest on ground.

19. The system of claim 16, wherein the ramp panels comprise:
a first ramp panel supported by a first one of the hinged connections on a first one of the upper lateral side edges of the chassis; and
a second ramp panel supported by a second one of the hinged connections on a second one of the upper lateral side edges of the chassis,
wherein the second one of the upper lateral side edges of the chassis is opposite the first one of the upper lateral side edges of the chassis.

20. The system of claim 1, wherein the ramp panels comprise:
a first pair of ramp panels that extend laterally outward in a first direction from the chassis; and
a second pair of ramp panels that extend laterally outward in a second direction from the chassis,
wherein the ramp panels in first the pair of ramp panels are parallel to one another, wherein the ramp panels in the second pair of ramp panels are parallel to one another,
wherein the material unloading station is between the first pair of ramp panels and the second pair of ramp panels.

21. The system of claim 20, wherein a first one of the ramp panels in the first pair of ramp panels aligns with a first one of the ramp panels in the second pair of ramp panels, and
wherein a second one of the ramp panels in the second pair of ramp panels aligns with a second one of the ramp panels in the second pair of ramp panels.

22. A method comprising:
providing a material handling system at a worksite that has one or more material holding containers, wherein the material handling system comprises:
a chassis;
a storage container supported by the chassis;
a conveyor system supported by the chassis and configured to convey a material from a material unloading station to a conveyor system discharge that is above an inlet of the storage container at an elevation that is higher than the material unloading station;

a pneumatic delivery system supported by the chassis and configured to deliver the material from the storage container pneumatically; and a drive-over ramp assembly supported by the chassis, wherein the drive-over ramp assembly comprises at least a pair of panels that, in a deployed position, form a ramp, over which a material delivery vehicle having a bottom delivery chute can drive while being physically supported by the ramp panels; and with the material handling system at the worksite:

receiving material at the material unloading station of the material handling system;

conveying, with the conveyor system, the material from the material unloading station to the inlet of the storage container; and delivering the material from the storage container, pneumatically, with a pneumatic delivery system supported by the chassis.

23. The method of claim 22, wherein receiving the material at the material unloading station comprises receiving the material:

from a material delivery vehicle above the material unloading station; or from a material delivery container supported on a framework above the material unloading station.

24. The method of claim 22, wherein conveying the material from the material unloading station to the inlet of the storage container comprises:

conveying the material, with a mechanical conveying system, from the material unloading station in a substantially horizontal direction and then in an upwardly angled direction to the conveyor system discharge.

25. The method of claim 22, wherein the material handling system comprises:

a housing for the conveyor system, wherein the housing defines an opening at the material unloading station through which the material can be loaded into the conveyor system; and a dust collector coupled to the housing or to the storage container, the method comprising:

drawing air and dust out of housing or out of the housing or the storage container with the dust collector as the material is conveyed by the conveyor system.

26. The method of claim 22, further comprising:

discharging the material from a bottom discharge of the storage container through an air lock coupled to the bottom discharge;

producing pressurized air in a pneumatic conveying line coupled to the air lock with an air blower; and discharging the material from the pressurized pneumatic conveying line through a channel that is coupled to the pressurized pneumatic conveying line.

27. The method of claim 22, further comprising:

configuring the drive-over ramp assembly in the deployed configuration to form a ramp with at least a pair of panels, wherein the ramp facilitates a material delivery vehicle with a bottom delivery chute being supported by the ramp while being driven over the ramp to position the bottom delivery chute above the material unloading station.

28. The method of claim 22, further comprising moving the material handling system from the worksite to another worksite on wheels that are coupled to the chassis.

29. The method of claim 22, wherein the work site is at a hydraulic fracturing well head.

30. The method of claim 22, wherein the material is a powder or granular material.

31. The method of claim 22, wherein the material is a proppant.

32. The method of claim 22, wherein each of the ramp panels of the material handling system is supported at a proximal end by a hinged connection along an upper lateral side edge of the chassis that enables the ramp panel to move, about the hinged connection, between the deployed position and a stowed position.

33. The method of claim 32, wherein the ramp panels, in the stowed position, extend in an upward and inward direction from the hinged connection, and wherein the ramp panels, in the deployed position, extend laterally outward and downward from the hinged connection so that the distal ends of the ramp panel rest on ground, and wherein the ramp panels comprise:

a first ramp panel supported by a first one of the hinged connections on a first one of the upper lateral side edges of the chassis; and a second ramp panel supported by a second one of the hinged connections on a second one of the upper lateral side edges of the chassis, wherein the second one of the upper lateral side edges of the chassis is opposite the first one of the upper lateral side edges of the chassis.

34. The method of claim 22, wherein the material handling system further comprises:

a framework supported by the chassis and configured to receive and to support a material delivery container positioned directly above the material unloading station for gravity unloading from the material delivery container into the material unloading station while the material deliver container is positioned directly above the material unloading station and is supported by the framework.

35. The method of claim 22, wherein delivering the material from the storage container, pneumatically, with the pneumatic delivery system supported by the chassis delivers the material into the one or more material holding containers at the worksite.

36. A material handling system comprising:

a storage container;

a conveyor system configured to convey a material from a material unloading station to a conveyor system discharge that is above an inlet of the storage container at an elevation that is higher than the material unloading station;

a pneumatic delivery system configured to deliver the material from the storage container pneumatically; and a drive-over ramp assembly, wherein the drive-over ramp assembly comprises at least a pair of ramp panels that, in a deployed position, form a ramp, over which a material delivery vehicle having a bottom delivery chute can drive while being physically supported by the ramp panels, wherein the storage container, conveyor system, pneumatic delivery system, and drive-over ramp assembly are supported by one or more chassis.

* * * * *